US009313863B2

(12) United States Patent
Hershberg et al.

(10) Patent No.: US 9,313,863 B2
(45) Date of Patent: Apr. 12, 2016

(54) METHODS, DEVICES, AND SYSTEMS FOR CONTROLLING SMART LIGHTING OBJECTS TO ESTABLISH A LIGHTING CONDITION

(71) Applicant: QUALCOMM Incorporated, San Diego, CA (US)

(72) Inventors: Joshua Hershberg, Beit Shemesh (IL); Gabriel Berelejis, Mevasseret Tzion (IL); Brian Vogelsang, San Deigo, CA (US); Fruma Adina Geffen, Beit Shemesh (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/683,821

(22) Filed: Apr. 10, 2015

(65) Prior Publication Data
US 2015/0351204 A1  Dec. 3, 2015

Related U.S. Application Data

(60) Provisional application No. 62/006,374, filed on Jun. 2, 2014.

(51) Int. Cl.
*H05B 37/02* (2006.01)
*G08C 23/02* (2006.01)

(52) U.S. Cl.
CPC ............ *H05B 37/0272* (2013.01); *G08C 23/02* (2013.01)

(58) Field of Classification Search
CPC ....................... H05B 37/0272; G08C 23/02
See application file for complete search history.

(56) References Cited

U.S. PATENT DOCUMENTS

| 8,264,168 | B2 | 9/2012 | Feri et al. | |
|---|---|---|---|---|
| 2008/0224026 | A1* | 9/2008 | Pasternak | G01J 5/0022 250/206 |
| 2012/0274234 | A1* | 11/2012 | Campbell | H05B 37/0245 315/294 |
| 2012/0312874 | A1* | 12/2012 | Jonsson | G06Q 10/087 235/385 |
| 2013/0043788 | A1 | 2/2013 | O'Brien | |
| 2013/0223279 | A1* | 8/2013 | Tinnakorns-risuphap | H04L 41/0809 370/254 |
| 2013/0249410 | A1 | 9/2013 | Thompson | |
| 2014/0269212 | A1* | 9/2014 | Xiang | G08C 23/02 367/197 |

OTHER PUBLICATIONS

Jahn M., et al., "The Energy Aware Smart Home," 5th International Conference on Future Information Technology (FutureTech), 2010, pp. 1-8.

* cited by examiner

*Primary Examiner* — Douglas W Owens
*Assistant Examiner* — Pedro C Fernandez
(74) *Attorney, Agent, or Firm* — The Marbury Law Group, PLLC

(57) ABSTRACT

A device controls a lighting condition of smart objects. A networking framework is executed on the device and the smart objects. An RF signal is broadcast from the device to the smart objects. The signal requests the objects to transmit an ultrasound signal. Ultrasound signals from the objects are received in the device via microphones. A range and direction to each object may be determined based on reception times of the ultrasound signals. A map of the location of the objects is generated. The objects are controlled, via the networking framework, based on the map. A user interface overlay that shows the current lighting condition and location of objects using icons is presented on the device display. The icons are interactive controls for the objects, which may be interacted with for control of the corresponding object. The objects may be manually or automatically controlled to achieve a lighting condition.

20 Claims, 14 Drawing Sheets

METHODS, DEVICES, AND SYSTEMS FOR CONTROLLING SMART LIGHTING OBJECTS TO ESTABLISH A LIGHTING CONDITION

CROSS REFERENCE TO RELATED APPLICATIONS

This application claims the benefit of priority to U.S. Provisional Patent Application No. 62/006,374 entitled "Methods, Devices, and Systems for Controlling Smart Lighting Objects to Establish a Lighting Condition" filed Jun. 2, 2014, the entire contents of which are incorporated herein by reference.

BACKGROUND

With the advent of the "Internet of Things" or the "Internet of Everything" such as networks of smart objects in the home, office, or facility, the need for simplified interactions with smart objects is rapidly increasing. To facilitate internetworked smart objects and control devices, various communication protocols have been developed. However, these communication protocols may not fully address challenges associated with interacting with smart objects. Further, these protocols may not fully exploit the capabilities presented by such networks of smart objects.

In a conventional communication protocol for communicating and/or networking with smart objects, a user interacts with smart objects that are connected to a network by addressing the object according to a generic name that is assigned during a registration process. The smart objects then appear by name on an application display of the control device. When many controllable smart objects having a generic or default name are present in the network, a user-interface challenge arises as users may be frustrated by a long list of all the objects connected in the network. It becomes difficult for users (i.e., humans) to distinguish smart objects that may appear on a display or in a physical space for purposes of selecting individual devices for control. If a specific kind of control is desired for smart objects having a specific object type, such as smart light bulbs, or a subset of specific objects, a particular group of smart light bulbs, challenges may increase.

Interaction with a device may be difficult because the association between the generic names and the actual objects in a space are difficult to ascertain. Further, the particular objects within the space that are targets for interaction, are not always easily known by the user based simply on seeing the generic name listing in a user interface. When sufficiently large numbers of smart objects of the same object type (e.g., same as the object type in the subset of smart objects targeted for interaction) are present in the home or facility (e.g., in different rooms and levels), it becomes even more challenging for users to know the association between generic names and actual smart objects. In particular, because the generic name may not be sufficiently descriptive (e.g., SmartBulb1, Smartbulb2, . . . ) a user may have difficulty determining which smart object name to select for interactions with a particular smart object of interest.

Interaction and control of smart objects may typically be provided by radio-frequency (RF) networks (e.g., WiFi, Bluetooth, etc.) based on application interfaces to communication resources and object features provided by a communication protocol that may provide a networking framework for internetworking smart objects. Within such protocol frameworks, user interactions with smart objects rely on addressing the objects using RF communications. With the ability to individually address smart objects, users can control an object simply by selecting the smart object based on its name and then entering a command, such as pressing a virtual key on a smart phone to cause the smart object to take an action, change its state or status, report a condition, and so on, based on RF communications addressed to and received from the selected smart object. A user may thereby individually control/interact with any smart object in a network within range of the RF communications and registered with a communication protocol framework. In most cases, such RF communications penetrate walls and floors and provide access to all smart objects in RF communications range in the home or facility. However, this capability makes it difficult to distinguish objects within a single room for room-specific addressing and control.

SUMMARY

The various embodiments include methods and devices implementing the methods for controlling a lighting condition by a control device. An embodiment method may include executing a networking framework on the control device, broadcasting a radio frequency (RF) signal on an RF communication channel associated with the networking framework from the control device for reception by a plurality of smart lighting objects registered with the networking framework. In the various embodiments, each of the plurality of smart lighting objects may be assigned an identifier within the networking framework, and the RF signal may be configured to cause each of the plurality of smart lighting objects to transmit an ultrasound signal including the assigned identifier. The control device may receive the ultrasound signals from a subset of the plurality of smart lighting objects via two or more ultrasound microphones, determine a range and a direction to each of the subset of the plurality of smart lighting objects from which ultrasound signals were received based on reception times of the ultrasound signals by each of the two or more ultrasound microphones, generate a three dimensional map of locations of the subset of the plurality of smart lighting objects from which ultrasound signals were received based on the determined range and the determined direction, and control a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition.

The various embodiments may further include presenting a user interface including a camera image showing a current lighting condition on a display of the control device. The user interface may include control objects associated with the subset of the plurality of smart lighting objects from which ultrasound signals were received and wherein the control objects are presented on the camera image based on their location identified in the three dimensional map. In such embodiments, controlling a lighting condition by sending control signals, via the networking framework, may include receiving a user input based on the presented camera image showing the current lighting condition and an interaction with one of the control objects and translating the received user input into a control command that is transmitted via the networking framework to one of the selected ones of the subset of the plurality of smart lighting objects corresponding to the one control object.

The various embodiments may further include presenting a new camera image showing a new lighting condition based on the transmitted control command. In such embodiments, controlling a lighting condition by sending control signals may include receiving a new user input based on the presented new camera image showing the new lighting condition and a new interaction with one of the control objects and translating the received new user input into a new control command that is transmitted via the networking framework to one of the selected ones of the subset of the plurality of smart lighting objects corresponding to the one control object.

In some embodiments, presenting the user interface including the camera image showing the current lighting condition on the display of the device may include presenting one or more selections for predetermined lighting conditions that provide pre-programmed control settings of one or more of the subset of the plurality of smart lighting objects. In such embodiments, controlling a lighting condition by sending control signals, via the networking framework, may include disabling a light output of a first one or more of the subset of the plurality of smart lighting objects within the camera image and adjusting a light output of a second one or more of the subset of the plurality of smart lighting objects outside the camera image to control the lighting condition.

In some embodiments, controlling a lighting condition by sending control signals, via the networking framework, may include processing an image captured by a camera to determine a required level of light for the lighting condition, identifying, based the three dimensional map and the processed image, one or more of the subset of the plurality of smart lighting objects that can be adjusted to achieve the required level of light, and transmitting commands via the networking framework to adjust a light output of the identified one or more of the subset of the plurality of smart lighting objects to achieve the required level of light for the lighting condition.

The various embodiments may further include processing the image to determine further changes to lighting required to achieve the desired lighting condition, and transmitting commands via the networking framework to readjust one or more of the subset of the plurality of smart lighting objects to achieve the required level of light for the lighting condition based on the determined further changes to lighting required to achieve the desired lighting condition.

In some embodiments, transmitting commands via the networking framework to adjust a light output of the identified one or more of the subset of the plurality of smart lighting objects may include transmitting commands to reduce a light output of a first one or more of the subset of the plurality of smart lighting objects within the image and to increase a light output of a second one or more of the subset of the plurality of smart lighting objects outside the image to achieve the required level of light for the lighting condition.

The various embodiments may further include determining whether a current lighting condition includes sufficient light to take a picture. In such embodiments, controlling a lighting condition by sending control signals, via the networking framework, may include processing an image captured by a camera to determine a required level of light for the lighting condition, identifying, based the three dimensional map and the processed image, one or more of the subset of the plurality of the smart lighting objects that can be adjusted to achieve the required level of light, and transmitting commands via the networking framework to adjust a light output of the identified one or more of the subset of the plurality of smart lighting objects to achieve the required level of light for the lighting condition.

Further embodiments may include a control device having at least a transceiver, two or more ultrasound microphones, and a processor configured with processor executable instructions to perform operations of the embodiment methods described above. Further embodiments may include a control device having means for performing operations of the embodiment methods described above. Further embodiments may include a non-transitory processor-readable storage medium on which are stored processor-executable instructions to perform operations of the embodiment methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
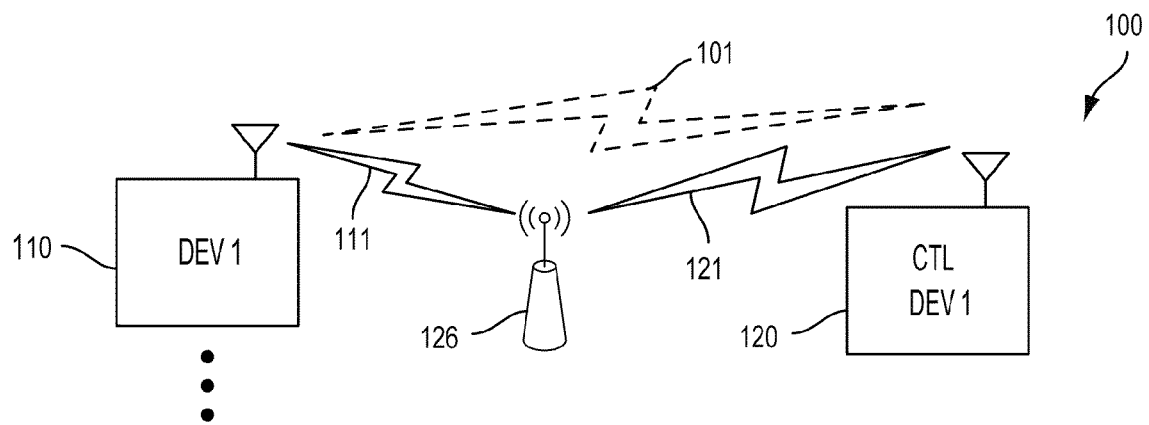
FIG. 1A is a communication system diagram illustrating components of a smart object network.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "control device" may refer to any one or all of personal or mobile computing devices, multimedia players, laptop computers, tablet computers, palm-top computers, personal computers, television set top boxes, integrated digital televisions, cable television receivers, and similar personal electronic devices which include a programmable processor and memory and circuitry for performing operations of the various embodiments.

As used herein, the term "smart lighting object" refers to any one or all of smart light bulbs, smart light emitting diodes (LEDs), and other devices that include a mechanism for affecting lighting conditions (i.e., an LED or a motor open/close blinds), a programmable processor and circuitry for receiving and responding to wireless signals sent via a networking framework. Reference to "smart" in connection with these devices may refer to the capability to communicate a device identifier (ID) and status, and control and operate the device remotely through a communication networking framework.

The term "networking framework" as used herein may refer interchangeably to a communications framework, an applications framework, and organized systems of communication and application-interaction protocols and commands for facilitating device-to-device (e.g., peer-to-peer or "P2P") and application-to-application communications and interactions. A networking framework may be implemented as a collection of Application Programming Interfaces (APIs), Software Development Kits (DSKs), and other application or system software that collectively provide standard mechanisms and interface definitions to enable interfacing between controlling and controlled smart objects coupled through a communication network that may be an ad hoc network. The various APIs and SDKs may provide high level access (e.g., from an application layer) to functions that would normally be accessed or controlled at a lower layer in a software architecture. Such functions may include, but are not limited to, ad hoc networking, security, pairing, device discovery, service discovery, platform transparency, radio access control, message formatting, message transmission, message reception and decoding, and so on. Some examples of organizations providing support for peer-to-peer interactivity include the Digital Living Network Alliance (DLNA®), Universal Plug and Play (UPnP) Alliance, and Bonjour. However, these technologies are generally device-centric and tend to operate at the lower layers within a software architecture (e.g., at the IP transport layer). An example of a comprehensive networking framework is the AllJoyn® Core Framework initially developed by Qualcomm Innovation Center and hosted by the Allseen Alliance.

The AllJoyn® Core Framework includes a set of service frameworks that are simple and enable users to interact with nearby object. An example of a set of service frameworks may include: Device Information & Configuration—the device broadcasts information such as device type, manufacturer and serial numbers; also allows the user to assign a name and password to the device; Onboarding—allows objects to be easily connected (e.g., via an intermediary such as an access point) to the user's network; Notifications—objects may broadcast and receive basic communications (e.g., text, image/video, audio, control, status); Control Panel—a control device such as a smartphone or tablet may control another object via a graphical interface (e.g., GUI or UI); Audio—audio source objects may stream to selected AllJoyn®-enabled speakers, audio receivers and other audio playback smart objects.

The various embodiments provide methods for facilitating the control smart lighting objects for achieving a desired lighting effect. The various embodiments enable the discovery and localizing of smart light bulbs in a room by a smart control device, such as a camera equipped to communicate with smart light bulbs via an RF communication network framework, such as an AllJoyn® framework. The smart light bulbs may be configured to communicate via the RF network framework and to emit sound signals, such as ultrasound signals. The smart control device may emit an RF request to all smart light bulbs to identify themselves. The smart light bulbs that receive the request may respond by emitting sound signals. The sounds signals may encode information (e.g., device ID, network name, capability, luminance, etc.). The smart control device may receive the sound signals using two or more microphones and build or update a list/database of smart light bulbs including their exact or relative locations by processing the received sound signals. A direction or relative bearing to each smart object may be calculated based on the relative time of arrival of the sound signals between each microphone. The position, location, or bearings associated with a sound source may be determined through triangulation. In an embodiment, a user interface may be displayed that enables a user to control nearby lighting by translating user inputs on the interface to control signals sent to specific smart light bulbs via the network framework. In an embodiment, a camera configured as a smart control device (or a smart control device having a camera, etc.), may provide an image of a scene to be photographed (e.g. captured), determine the potential impact of each smart light bulb, determine adjustments to lighting levels on specific smart light bulbs to achieve a particular lighting effect on the scene, and transmit corresponding control signals to the specific smart light bulbs via the network framework. In this manner, a smart camera may be configured to automatically adjust lighting conditions on a scene within the camera's field of view in order to achieve a desired photographic effect by controlling smart lighting objects whose light affects the scene. Such automatic control may take into account manual or fixed settings for controllable parameters such as ISO, aperture, shutter speed, and so on. Alternatively or additionally, the automatic control procedures may automatically adjust one or more of the lighting conditions and the camera settings to achieve a desired photographic effect.

The various embodiments may be implemented within a variety of communication systems, such as the example communication system 100 illustrated in FIG. 1A. In an embodiment, a communication system 100 may include a control device 120, such as a mobile communication device (e.g., smartphone, tablet, etc.). The control device 120 may control one or more smart lighting objects 110 through links 111, 121 established with an access point 126 (e.g., wireless access point, wireless router, etc.). In an alternative embodiment or embodiments, the control device 120 may connect directly with the smart lighting object 110 through a direct connection 101. Further in an alternative embodiment or embodiments, the smart lighting objects 110 may connect with each other, either through a direct link (e.g., connection 101) or through a link provided through the access point 126.

Figure 1B:
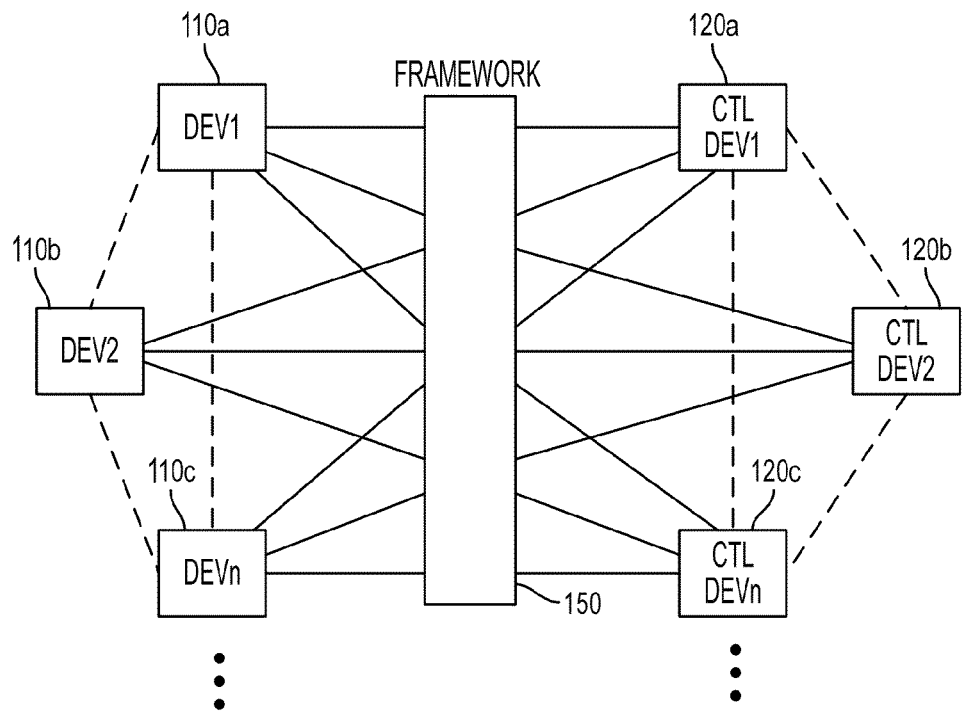
FIG. 1B is a communication system diagram illustrating a networking framework, control devices and smart lighting objects suitable for use with the various embodiments.

In the various embodiments, interconnections between the control device 120 and the smart lighting objects 110 may be established through a networking framework 150 as illustrated in FIG. 1B. One or more smart lighting objects 110, such as a DEV 1 110*a*, a DEV 2 110*b*, or a DEV n 110*c*, may be coupled to one or more control devices such as a CTL DEV 1 120*a*, a CTL DEV 2 120*b*, and a CTL DEV n 120*c*. In FIG. 1B, the solid lines illustrate that, in some embodiments, all of the smart lighting objects 110 may be connected to each other through the networking framework 150. Interconnection through the networking framework 150 may require that smart lighting objects be registered with the networking framework as will be described in greater detail hereinafter. In addition, in some embodiments the control device 120 may also require registration with the networking framework. In various embodiments, the dotted lines illustrate that at least some of the smart lighting objects 110 may be connected directly with each other. Direct connections between the smart lighting objects 110 may be compatible with the networking framework 150 as ad hoc connections may be established between smart lighting objects 110 that are not capable of accessing the networking framework 150 directly, such as through an access point. Alternatively or additionally, the smart lighting objects may establish ad hoc connections in addition to connections through the networking framework 150. In such embodiments, one smart lighting object may provide another smart lighting object with access to the networking framework 150 through a direct connection between the smart lighting objects, provided that at least one of the smart lighting objects has access to a network connection. Network access may allow smart lighting objects 110 to be controlled by control devices 120. Alternatively, the smart lighting objects 110 and the control devices 120 may establish peer-to-peer networks by direct connections (e.g., connection 101).

Figure 1C:
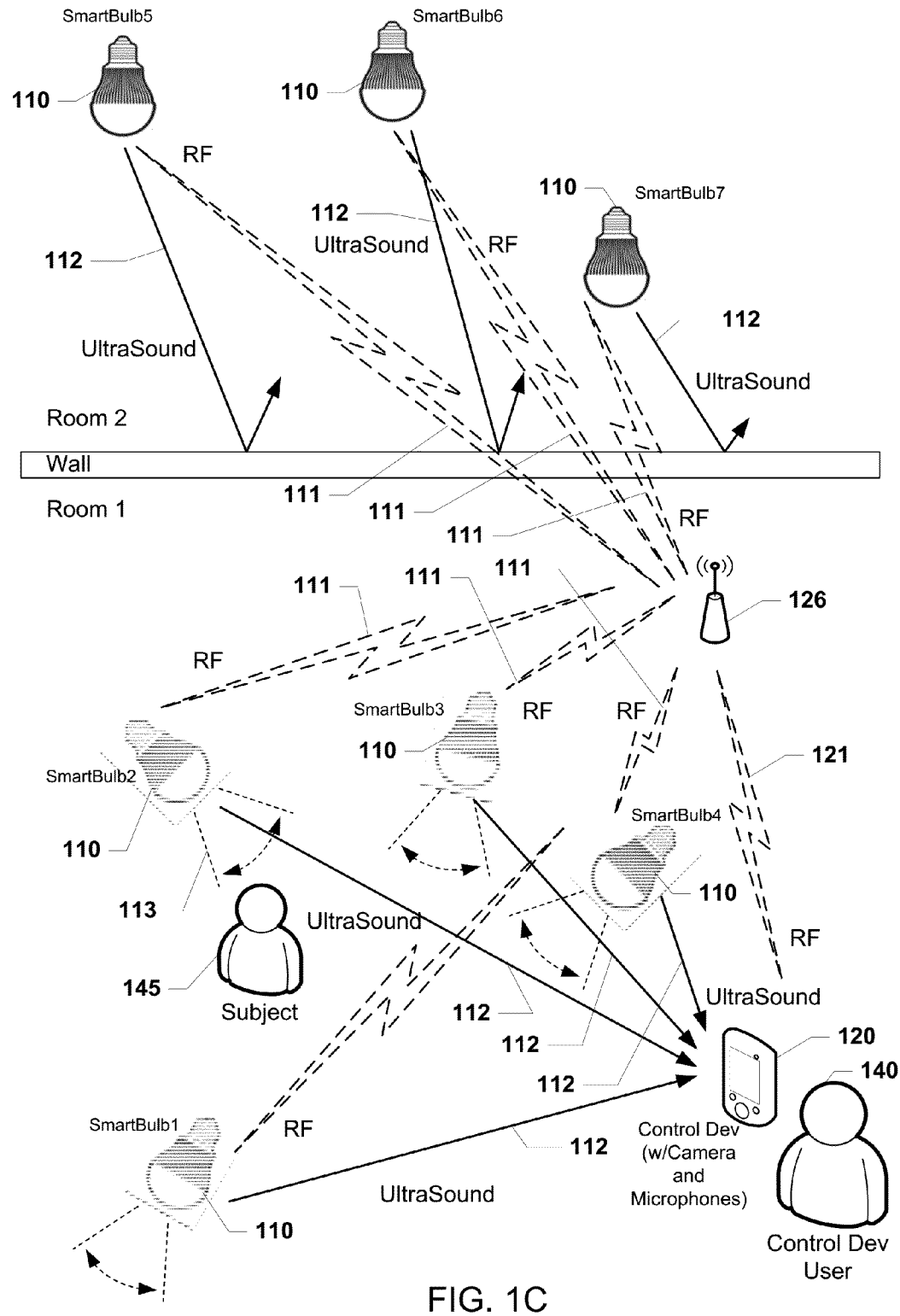
FIG. 1C is a communication system diagram illustrating a control device and smart lighting objects for controlling a lighting condition suitable for use with the various embodiments.

In the various embodiments smart lighting objects may be controlled to establish a lighting condition as illustrated in FIG. 1C. A control device user 140 may use the control device 120 to enter a room having a series of smart lighting objects 110 and control the lighting condition in the room. The lighting condition may be controlled to establish a desired lighting level for various purposes, such as to establish a lighting condition for taking a photograph or series of photographs (e.g., of a subject 145). The lighting condition may also be controlled to establish a desired lighting level for taking a video. The lighting condition may be controlled for other purposes such as to establish a desired lighting ambiance for the room. In some embodiments, each of the smart lighting objects 110 may have a lighting zone of illumination 113, which may be a direction and coverage area of the light output from the smart lighting object 110. The control device 120 may be coupled through an RF link 121 to an access point 126. The smart lighting objects 110 may be coupled through respective RF links 111 to the access point 126. By the RF links 111 and 121 and the operation of the framework 150, the smart lighting objects 110 may be controlled by the control device 120 as disclosed herein. Alternatively, the operation of the networking framework 150 may enable framework communication between the smart lighting objects 110 and the control device 120 when connected directly through the connections 101.

During control operations, the control device 120 may select, through a variety of approaches, the smart lighting objects 110 to control and the level of control to apply to each in order to establish the desired lighting conditions. For example, in order to control the lighting condition, the control device 120 may discover the locations of the smart lighting objects 110, and from this information determine the smart lighting objects that will significantly affect the lighting condition in the room or in a particular portion of the room, such as a scene within the view finder of a camera. In some embodiments, the zone of illumination 113 of each of the smart lighting objects 110 may be analyzed to determine the pointing direction and illumination area of the smart lighting objects 110. In some embodiments, the smart lighting objects may be provided with a mechanism to determine their pointing direction in addition to their location. The zone of illumination 113 for each of the smart lighting objects 110 may be evaluated to determine whether each smart lighting object 110 casts light in a direction that can be used to establish the desired lighting condition. For example, the zone of illumination 113 may be evaluated to determine whether light is cast in the appropriate direction of the subject 145 for the purpose of taking a photograph.

In the photography example illustrated in FIG. 1C, a smart lighting object 110 (e.g., "SmartBulb2") may be located directly behind the subject 145, with a zone of illumination 113 that points directly at the camera of the control device 120. In such cases, the smart lighting object 110 located behind the subject 145 may be disabled or dimmed. Other smart lighting objects 110 (e.g., "SmartBulb3," "SmartBulb4") may be located in such a way that the respective zones of illumination 113 are pointed in a direction toward the subject 145. In such cases, these objects may have a positive effect on the lighting conditions of the subject 145. A smart lighting object 110 (e.g., "SmartBulb1") may be positioned such that the zone of illumination 113 is pointing away from the subject 145. In such cases, SmartBulb1 may be automatically configured for backlighting or may be disabled or dimmed depending on various factors, which may be evaluated by a processor within the control device 120 in a control process and feedback provided through a camera. Alternatively, the control device user 140 may judge the contribution of each of the smart lighting objects 110 and make manual adjustments via a user interface.

In automatic control embodiments, the control device 120, using embedded devices such as a camera and knowledge of the location of the smart lighting objects 110, may use light metering algorithms to determine how best to light up the subject 145. Based on the evaluation of the lighting condition, the control device 120 may remotely control one or more of the smart lighting objects 110 to provide the desired lighting condition through control signals transmitted through the networking framework links, such as the RF links 111 and 121. Further, algorithms may take into account existing camera settings such as ISO, aperture, shutter speed, etc. when determining how to control smart lighting objects to achieve lighting conditions suitable for photography or videography with those camera settings. Additionally, algorithms may automatically adjust camera settings (e.g., ISO, aperture, shutter speed, and so on) in combination with sending commands to control smart lighting objects in order to facilitate photography. The algorithms may further take into account or adjust camera settings to facilitate establishing a desired lighting condition or effect.

In some embodiments, the control device 120 may discover all of the smart lighting objects 110 in the proximal network. The control device 120 may sequentially control each of the smart lighting objects individually through control signals transmitted through the networking framework in a discovery sequence to cause each of the smart lighting objects 110 lights to blink in a certain recognizable pattern. Using the camera, the control device 120 may watch for the pattern. The control device user 140 may also watch for the blinking sequence for a manual confirmation. When the control device 120 detects the pattern, the corresponding smart lighting object may be identified as one that can be manipulated to affect the lighting condition. The zone of illumination 113 of the smart lighting object 110 and possibly a general pointing direction may also be determined.

In some embodiments, the control device 120 may learn the relative position of the smart lighting objects 110 through the secondary communication channels 112, by receiving the acoustic signal from the smart lighting objects 110 and performing trigonometric calculations in order to calculate the relative bearing and positions of the acoustic emitter or emitters. In some embodiments, a "map" of the locations of individual smart lighting objects 110 may be generated using the position information. The map may contain interactive icons for each of the smart lighting objects 110, and may be overlaid on to the display of the control device 120, such as over the camera display. In some embodiments, the overlay may include those smart lighting objects 110 that may have an effect on the lighting condition. The control device user 140 may interact with the icons, such as through touch, in order to adjust the brightness of the corresponding smart lighting object 110.

In an embodiment, the smart lighting objects 110 may be configured to communicate with each other via both RF links 111 of the networking framework and the secondary audio communication links 112 in a coordinated manner that enables the smart lighting objects to collectively develop a map of their respective locations. Such coordinated communications may include each smart lighting object 110 requesting others via RF links 111 of the networking framework to emit ultrasound signals (i.e., via the secondary audio communication links 112), listening for the responses, and sharing the time of reception (or time delay between request and reception) of the audio signals with other smart lighting objects. Using a combined set of reception or delay time data, a smart lighting object processor may generate a map of relative locations of all smart lighting objects in the room using known calculation processes (e.g., trilateration). This map of smart lighting objects 110 may be communicated to the control device 120 via RF links 111 of the networking framework, and the control device may use this map of locations of individual smart lighting objects 110 as described above. The embodiment enables control devices that lack ultrasound microphones to also be able to control lighting conditions according to the various embodiments.

In the network framework environment (e.g., AllJoyn®) and other service advertisement/discovery mechanisms, the smart lighting objects 110 may advertise basic information about themselves through operation of the RF links 111 and on the secondary communication links 112, such as ultrasound links.

In some embodiments, the control device 120 may use light sensors on the control device 120 (e.g., a camera) to determine whether the ambient light is sufficient or optimal for the desired condition or application, such as for taking a picture of a scene being imaged by a camera. The sensor data may be used to determine whether the illumination levels of one or more of the smart lighting objects 110 should be increased or decreased. The map of the smart lighting objects may be used in such calculations to identify those smart lighting objects whose illumination levels should be adjusted in order to adjust the light conditions, such as the light levels on a scene viewed by the camera. The control device 120 may send control signals via RF links 111 of the networking framework to individual smart lighting objects 110 to cause each to adjust its illumination. Such control signals may be sent to smart lighting objects 110 one at a time followed by analysis of the resulting lighting condition, with further adjustment signals sent in an iterative manner in order to establish the desired lighting condition.

Figure 2:
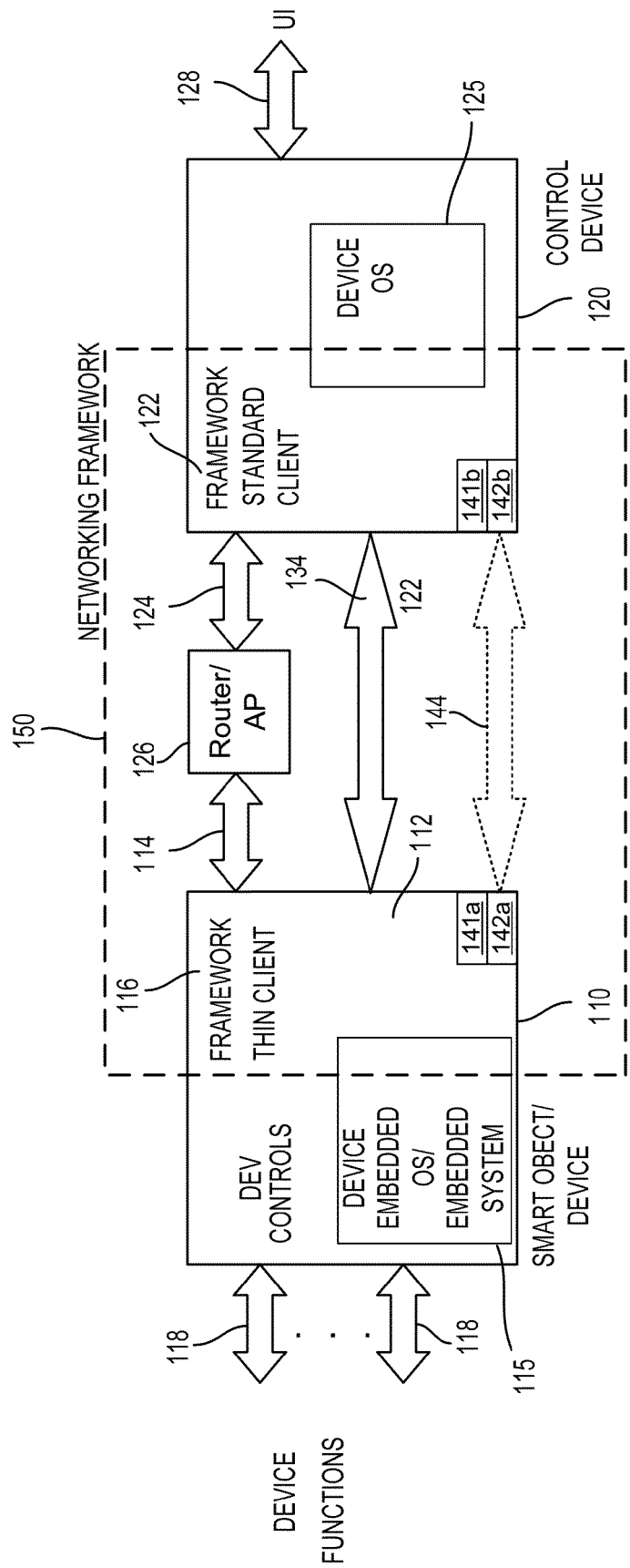
FIG. 2 is a functional block diagram illustrating a control device interacting with a smart lighting object via a wireless communication networking framework suitable for use with the various embodiments.

In the various embodiments, device configurations in a networking framework 150 may be implemented as illustrated in FIG. 2. The networking framework 150 may refer to the core aspects of the networking framework, such as the AllJoyn® framework, which may include client applications on each device (i.e., smart lighting objects and the control device), as well as devices facilitating network communications, such as a wireless router or other access point 126. The networking framework 150 provides client services to the control device 120 and the controlled smart lighting object 110 and represents a distributed software bus architecture that enables the control device 120 to control the controlled smart lighting object 110 through framework connections 114, 124, 134, and a series of APIs, SDKs, and other software mechanisms. The framework connections 114, 124, 134 may be considered to be parts of a distributed software bus. In an embodiment, the networking framework 150 allows applications to interact through a series of universal high level software mechanisms.

Applications that are compatible with the networking framework 150 may interact with each other via the networking framework 150 (similar to a software bus). In an AllJoyn® framework, for example, such applications may be referred to as a Bus Attachment. A Bus Attachment may be any type of application and may have a unique name. The unique name may be automatically assigned when a Bus Attachment is connected to the AllJoyn® Bus (e.g., during Onboarding). The Bus Attachment may create Bus Objects, which may identify themselves to other Bus Objects using a process of Advertising to broadcast their existence. A Discovery process allows a Bus Object to determine the existence of other Bus Objects. A Bus Object may access services provided by other AllJoyn® Bus Attachments.

In the various embodiments, the control device 120 may be configured with a networking framework standard client 122 that provides direct or indirect access to the resources of the control device 120. Access for the networking framework standard client 122 may be provided through access to the control device operating system 125 and the hardware (and software) resources of the device platform of the control device 120. The resources may include access to a processor, memory, and a user interface 128, which may include display resources and input resources (e.g., hard or soft keyboard, touchscreen, mouse, camera, microphone(s), accelerometer, etc.).

In the various embodiments, a smart lighting object 110, such as a smart bulb, typically has limited processing resources. In the various embodiments, such a smart lighting object 110 may be configured with a networking framework thin client 116, which provides direct or indirect access to the resources of the smart lighting object 110. Access for the networking framework thin client 116 may be provided through access to the smart lighting object embedded operating system or embedded system 115. In a situation where the smart lighting object 110 has extensive processing resources, the smart lighting object 110 may nevertheless be equipped with the networking framework thin client 116. The networking framework thin client 116 may be provided when the smart lighting object 110 is primarily configured to be a controlled device. However, when the smart lighting object 110 can also operate to control other smart lighting objects, the smart lighting object 110 may be configured as a control device 120 with the networking framework standard client 122. In some embodiments, the smart lighting object 110 may not have sufficient resources to complete processing tasks. In such situations, processing requirements may be distributed to other clients, such as the networking framework standard client 122 on the control device 120, or to other smart lighting objects or control devices.

The networking framework thin client 116 on the smart lighting object 110 may further have access to the functions or services 118 provided by the smart lighting object 110. The functions or services 118 may be actions that can be controlled by the control device 120, such as dimming or turning on and off a smart bulb. The functions or services 118 may further include providing status indications or notifications to the control device 120. Alternatively, or in addition, the smart lighting object 110 may provide information about the capabilities of the smart lighting object 110, such as its functions or services 118 that are available.

In the AllJoyn® framework example, the AllJoyn® Thin Client (AJTC) provides the distributed programming environment to the generally limited resources of a smart lighting object 110 configured as an embedded system. Since the operating environment in which an AJTC operates may be very constrained, an AllJoyn® component, such as a Bus Object must live within the system constraints. The AllJoyn® Standard Client (AJSC) may be configured to take advantage of the features of high performance processors typically installed in control devices, such as multi-threading capabilities. However smart objects running the AJTC typically do not have such resources. Thus, an AllJoyn® daemon, which typically accompanies the AJSC and requires multi-threading, handles many network connections, and uses relatively large amounts of memory may not be provided in the AJTC. Other enhanced aspects of the AJSC are also not available in the AJTC, such as the ability to run an object-oriented programming environment that includes alternate language bindings. Accordingly, the AJTC is configured as a Bus Attachment having data structures corresponding to interfaces, methods, signals, properties of the smart object. Bus Objects in the AJTC may be highly optimized for efficient use of memory space. Thus, the APIs in the AJTC are typically different from those provided in the AJSC. Although the APIs may be different in the AJTC, all of the major conceptual blocks of the AllJoyn® framework that are found in AJSC can be found in AJTC systems in a compact form. In some instances, some Bus Objects may be configured to run remotely on another, more capable machine.

In the various embodiments, communications between smart objects and control devices may use an audio (e.g., ultrasound) secondary communication channel 144. Such an audio secondary communication channel 144 may be used for localizing smart lighting objects, as well as identifying those smart lighting objects within a particular room (because sound does not carry well through walls, floors and ceilings). The audio secondary communication channel 144 may be established via an audio emitter 141a (e.g., a speaker or ultrasound transducer) of the smart lighting object 110 and an audio receiver or receivers 141b, and 142b of the control device 120 (e.g., microphones, ultrasound microphones, etc.). In some embodiments, the smart lighting object 110 may be configured with an audio receiver 142a (or receivers) that allows the device to receive ultrasound signals from other smart lighting objects 110 and control devices 120. Thus, bidirectional ultrasound communications may be enabled between devices.

The smart lighting object 110 may encode information in an ultrasound signal that is emitted from an ultrasound emitter, such as the audio emitter 141a in a format for reception by an ultrasound microphone 142b on the control device. The control device 120 may include two or more ultrasound receivers 142b to enable the device to calculate the direction from which ultrasound signals are received. With two or more ultrasound receivers 142b, the secondary communication module may be equipped to provide additional information regarding the relative position of the source of the received ultrasound signal. For example, with two ultrasound receivers 142b (e.g., microphones) the control device 120 may establish at least a relative bearing or direction of the ultrasound emitter, with three ultrasound receiver elements, the control device may establish at least a three-dimensional position of the emitter. In an embodiment, the formatting and the decoding of received ultrasound signals on the audio secondary communication channel 144 may be accomplished by the same or similar software modules and layers as the networking framework 150.

The audio secondary communication transmitters and receivers 141a, 141b, 142a, 142b may provide an audio secondary communication channel 144 between the smart lighting object 110 and the control device 120 and/or other smart lighting objects 110. This audio secondary communication channel 144 may be used for sending information between devices, in addition to enabling the range and bearing determinations discussed above. In some embodiments, communications may be conducted directly on the audio secondary communication channel 144 as ad-hoc or out-of-framework communications. The communications on the audio secondary communication channel 144 may be brought within the networking framework once sent/received. In some embodiments, bi-directional communications on the audio secondary communication channel 144 may be facilitated using the primary channel, such as the framework connections 114, 124, 134.

In some embodiments, the control device 120 may send a request to the smart lighting objects 110a-110f on the RF communication channel 221. In response to the request, each of the smart lighting objects 110a-110f may transmit an ultrasound signal 233a-233f from their respective secondary communication modules 230a-230f. Ultrasound signals are generally considered to be acoustic signals with a frequency above 20 kHz. As ultrasound signals propagate through various materials or media, the ultrasound signals may altered or blocked due to absorption, attenuation, scattering and other phenomenon. For ease of description, a detailed explanation of the mechanics of ultrasound propagation is omitted. However, it is generally accepted that ultrasound and other high-frequency audio or acoustic signals do not propagate easily through dense materials such as walls and floors.

Figure 3A:
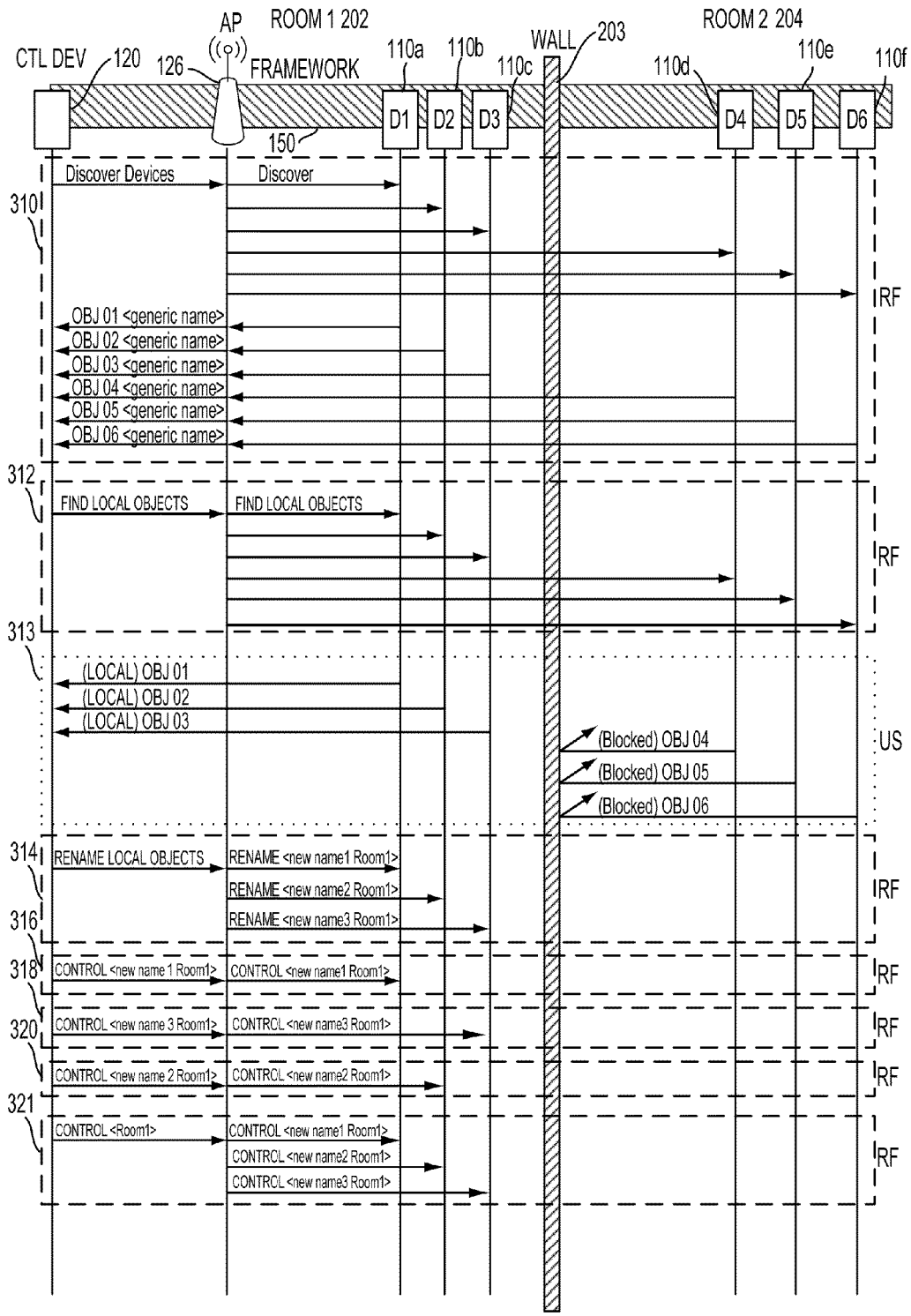
FIG. 3A is a message flow diagram illustrating communication interactions between a control device, access point, and smart lighting objects in different rooms for renaming.

Communication between the control device 120 and the smart lighting objects 110a-110f are further illustrated in FIG. 3A. The control device 120 and the smart lighting objects 110a-110f may establish physical connections to a network through the access point 126. Such connections may also provide a logical connection to the networking framework 150. The control device 120 may be equipped with the networking framework standard client associated with the networking framework 150 and the smart lighting objects 110a-110f may be configured with the networking framework thin client associated with the networking framework 150 as previously described. The networking framework 150 may provide a series of APIs that enable the various smart lighting objects and networking framework clients to send and receive messages defined in the networking framework for various actions required for interoperation. In a message sequence 310, which may be associated with an RF communication channel, the control device 120 may transmit a message such as a discovery request message to discover the smart lighting objects currently registered with the networking framework 150. The discovery request message may be broadcast to all of the smart lighting objects 110a-110f through operation of the networking framework 150.

In response to the discovery request message, the smart lighting objects 110a-110f may respond with messages that identify each device by its generic name. For example the device D1 110a may respond as "OBJ 01," which represents the <generic name> of the device D1 110a. The device D2 110b may respond as "OBJ 02," which represents the <generic name> of the device D2 110b, and so on, to the device D6 110f, which may respond as "OBJ 06" representing the <generic name> of the device D6 110f. When all of the smart lighting objects are discovered the control device 120 may display the generic names of the smart lighting objects on a user interface display. Because the control device 120 may be presently located in the Room 1 202, the number of smart lighting objects that respond to the request may exceed the smart lighting objects that are visible in the Room 1 202 and may confuse the user of the control device 120 as to which of the device are and are not located in the Room 1 202.

In the various embodiments, alternatively or in addition to the device discovery in the message sequence 310, the control device 120 may transmit a request for the smart lighting objects 110a-110f to identify themselves through respective secondary communication channels in a message sequence 312 that may be associated with an RF communication channel. In response to the message sequence 312, the smart lighting objects 110a-110f may respond through secondary communication channels by sending respective ultrasound signals in message sequence 313 that may be associated with an ultrasound communication channel or channels. The control device 120 receives the ultrasound signals from only the smart lighting objects D1 110a, D2 110b, and D3 110c in the same room. The control device 120 does not receive the ultrasound signals from the smart lighting objects D4 110d, D5 110e and D6 110f in another room due to the signals being blocked by the wall 203. In response to the reception of only the ultrasound signals from the smart lighting objects D1 110a, D2 110b, and D3 110c in the same room, these smart lighting objects may be highlighted on the user display. In some examples, additional smart lighting objects from which ultrasound signals were not received, such as the smart lighting objects D4 110d, D5 110e and D6 110f in another room, are not displayed. Thus, the list of smart lighting objects within Room 1 can be effectively "filtered" from the complete list of smart lighting objects that may be interacted through the networking framework.

In the various embodiments, when the control device 120 has a filtered list of smart lighting objects within the Room 1 202, or a list in which only those smart lighting objects are highlighted, the smart lighting objects may be re-named in a message sequence 314 that may be associated with an RF communication channel. The control device may transmit a message to rename the smart lighting objects D1 110a, D2 110b, and D3 110c in the same room with a prefix or suffix associated with the room (e.g., Room 1). Thus, the generic device name may be transformed into a room-specific name. While the name "Room 1" is used as a generic example, the room name may be descriptive of the actual room (e.g., "LivingRoom," "Bedroom," "Kitchen," etc.). Alternatively or in addition to, the control device 120 may rename the smart lighting objects to add more specific information about the actual device such as "EndTableLampLivingRoom," "OverheadLampLivingRoom," and so on based on confirming the specific identities of each device, such as through pointing and confirmation, which is described in greater detail hereinafter. When the smart lighting objects are renamed, the networking framework definitions may also be updated to reflect the new names. For example, as part of a "Rename" API provided with networking framework components, the networking framework may automatically update references to the device to reflect the new name.

In some embodiments, when the control device 120 has renamed the smart lighting objects with new names descriptive of the rooms and actual smart lighting objects, the control device 120 may interact with the smart lighting objects. The control device 120 may interact individually with each object by using the new name of each object as a messaging address associated with an RF communication channel, as shown in message sequences 316, 318 and 320. In some embodiments, the control device 120 may further interact with the objects as a group by reference to the room name, as shown in message sequence 321 that may be associated with an RF communication channel.

Figure 3B:
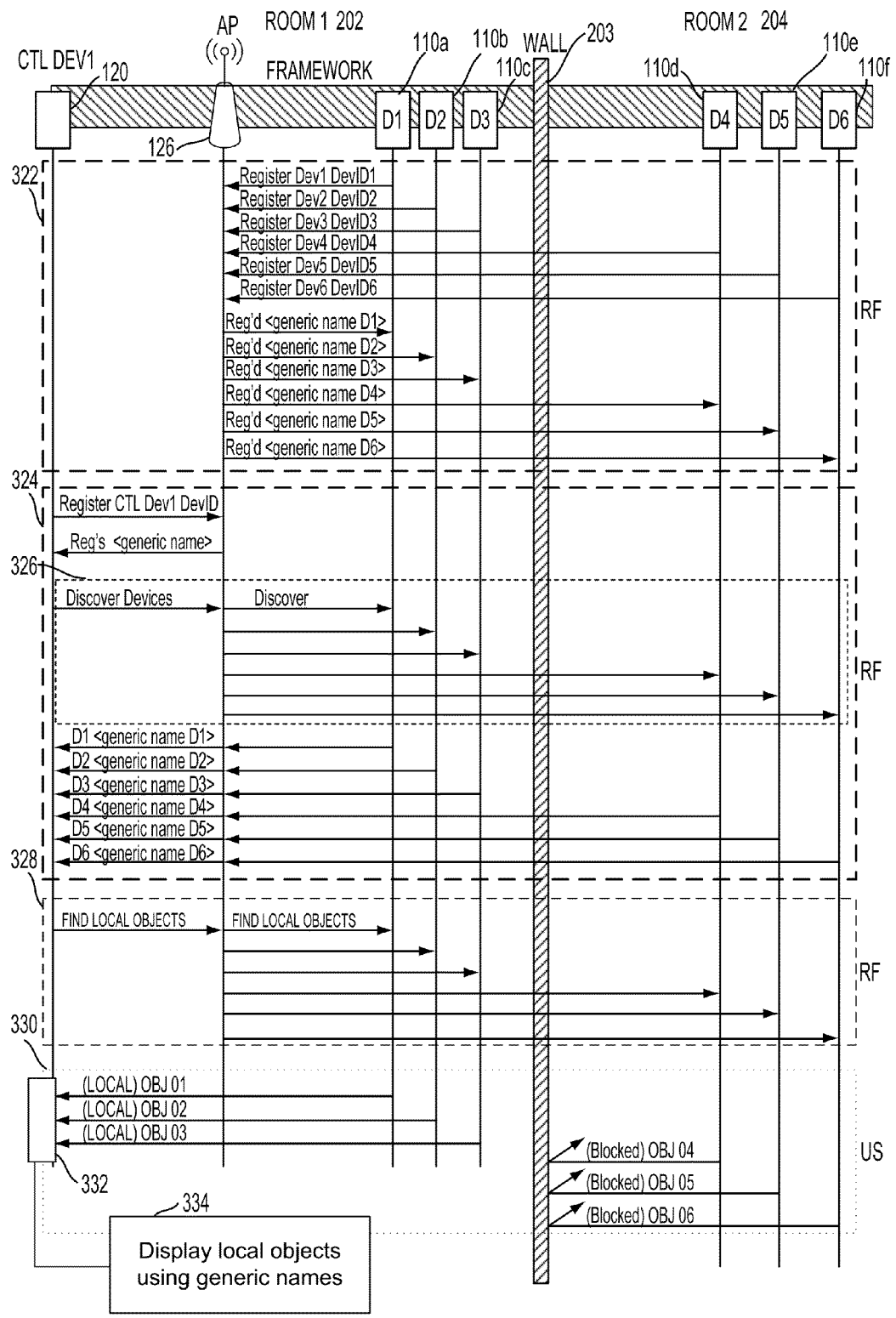
FIG. 3B is a message flow diagram illustrating communication interactions between a control device, access point, and smart lighting objects in different rooms for networking framework registration.

In order to be recognized within the networking framework 150, the smart lighting objects, including the smart lighting objects 110a-110f and the control device 120, must register with the networking framework as illustrated in FIG. 3B. For example, in the AllJoyn® framework registration is conducted through a process known as "Onboarding." In some embodiments, each device such as the smart lighting objects D1 110a, D2 110b, D3 110c, D4 110d, D5 110e, and D6 110f may transmit a registration request message to the networking framework 150, such as by sending a message on an RF communication channel through the access point 126 in a message sequence 322. In some embodiments, the access point 126 may be configured with a networking framework component that may be used to track and record registration of networking framework objects. In some embodiments, the control device 120 may transmit a registration request message in order to register with the networking framework 150 in a message sequence 324. The control device 120 may transmit a message on an RF communication channel through the access point 126.

As part of the networking framework registration, the control device 120 may receive all of the currently onboarded objects, such as the smart lighting objects 110a-110f. Alternatively or in addition, the control device may send a discovery request message in a message sequence 326. Upon receipt of the message the smart lighting objects may be identified to the control device 120. In some embodiments, the access point 126 may be equipped with a networking framework component such that a message need not necessarily be sent to each device. Rather, the access point 126 may update the control device 120 with the generic names of the registered objects (e.g., smart lighting objects). The networking framework component of the access point 126 may further notify the smart lighting objects of the registration of the control device 120. Alternatively, the control device 120 may notify or advertise its presence within the networking framework 150. As in the message sequence 312 in the previous example, when the control device 120 has discovered and displayed all of the currently registered smart lighting objects, a request may be transmitted for the smart lighting objects 110a-110f to identify through respective secondary communication channels, as shown in a message sequence 328 that may be associated with an RF communication channel.

In response to the message sequence 328, the smart lighting objects 110a-110f may respond through secondary communication channels by sending respective ultrasound signals in message sequence 330 that may be associated with an ultrasound communication channel or channels. The control device 120 receives the ultrasound signals from only the smart lighting objects D1 110a, D2 110b, and D3 110c in the same room. The control device 120 does not receive the ultrasound signals from the objects in other rooms 110110110 due to the signals being blocked by the wall 203. In response to receiving only the ultrasound signals from the smart lighting objects D1 110a, D2 110b, and D3 110c in the same room, these smart lighting objects may be highlighted on the user display in block 334. In some examples, additional smart lighting objects from which ultrasound signals were not received, such as the smart lighting objects D4 110d, D5 110e and D6 110f in another room, are not displayed. Thus, the list of smart lighting objects within Room 1 can be effectively "filtered" from the complete list of smart lighting objects which may be interacted through the networking framework. The smart lighting objects may be renamed and controlled as described above in connection with the message sequences 314, 316, 318, 320 and 321.

Figure 3C:
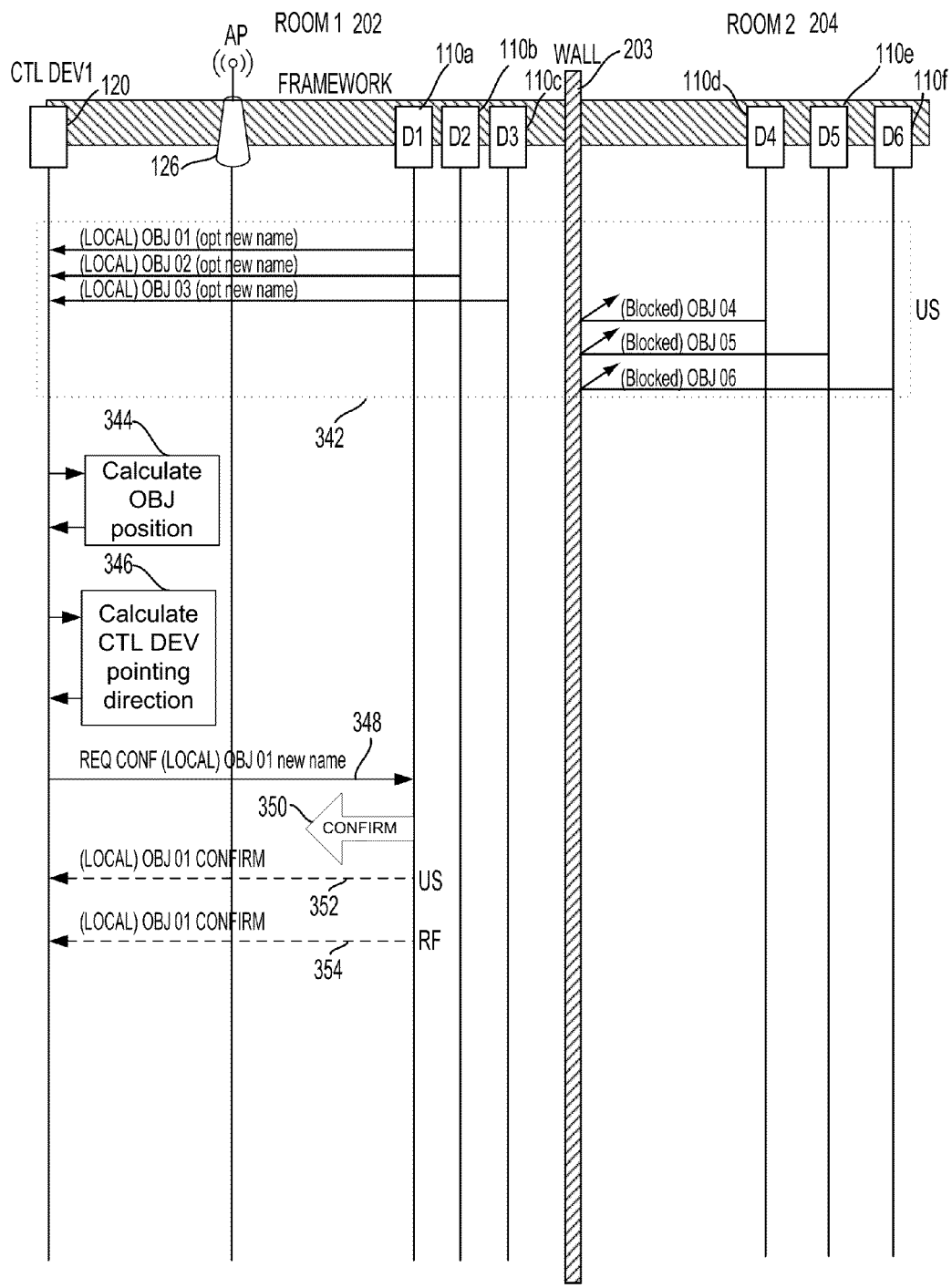
FIG. 3C is a message flow diagram illustrating communication interactions between a control device, access point, and smart lighting objects in different rooms for pointing and control.

In the various embodiments, the positions of smart lighting objects and a pointing direction of the control device may be determined as illustrated in FIG. 3C. The smart lighting objects 110a-110c may transmit signals as previously described using the ultrasound communication channel as shown in message sequence 342. The control device 120 may be equipped with at least two ultrasound receiving elements (e.g., microphones) by which the ultrasound signals may be received. Based on reception of the ultrasound signals, the control device 120 may calculate the position of the objects in the Room 1 202. The control device 120 may further calculate a pointing direction in block 346. The pointing direction of the control device 120 may be calculated using an onboard accelerometer, gyroscope, or other similar device capable of generating a pointing direction of the device. As previously described, the absolute or relative locations of the smart lighting objects may be previously obtained and stored. When the pointing direction is obtained, the control device 120 may compare the pointing direction to a list of stored locations to assist in identifying the device with which the control device wishes to interact. The control device 120 may point to an object and transmit a message 348 requesting confirmation. The request message may contain the new name of the object. The object may respond to the message 348 by a confirmation 350. The confirmation 350 may include a blink or other visually or audibly discernible confirmation that the device to which the control device 120 is pointing corresponds to a smart lighting object listed and highlighted in the display of the control device 120.

In some embodiments, the pointing procedure may be used during a renaming process. For example, the user may point the control device 120 at a smart lighting object to be named, such as an end table lamp, and prompt the control device to transmit the confirmation request message 348. The control device may confirm that the object to which the control device is pointing is the intended object, and rename the object, such as to "EndTableLampRoom1." If locations of the objects or smart lighting objects are already known by the control device 120 or the networking framework 150, the control device 120 may ascertain the identity of the smart lighting object at which the control device 120 is pointing. In such a case, alternatively or in addition to providing a confirmation 350, the control device 120 may transmit a confirmation 352 on the secondary communication channel or transmit a confirmation 354 on the RF communication channel.

Figure 3D:
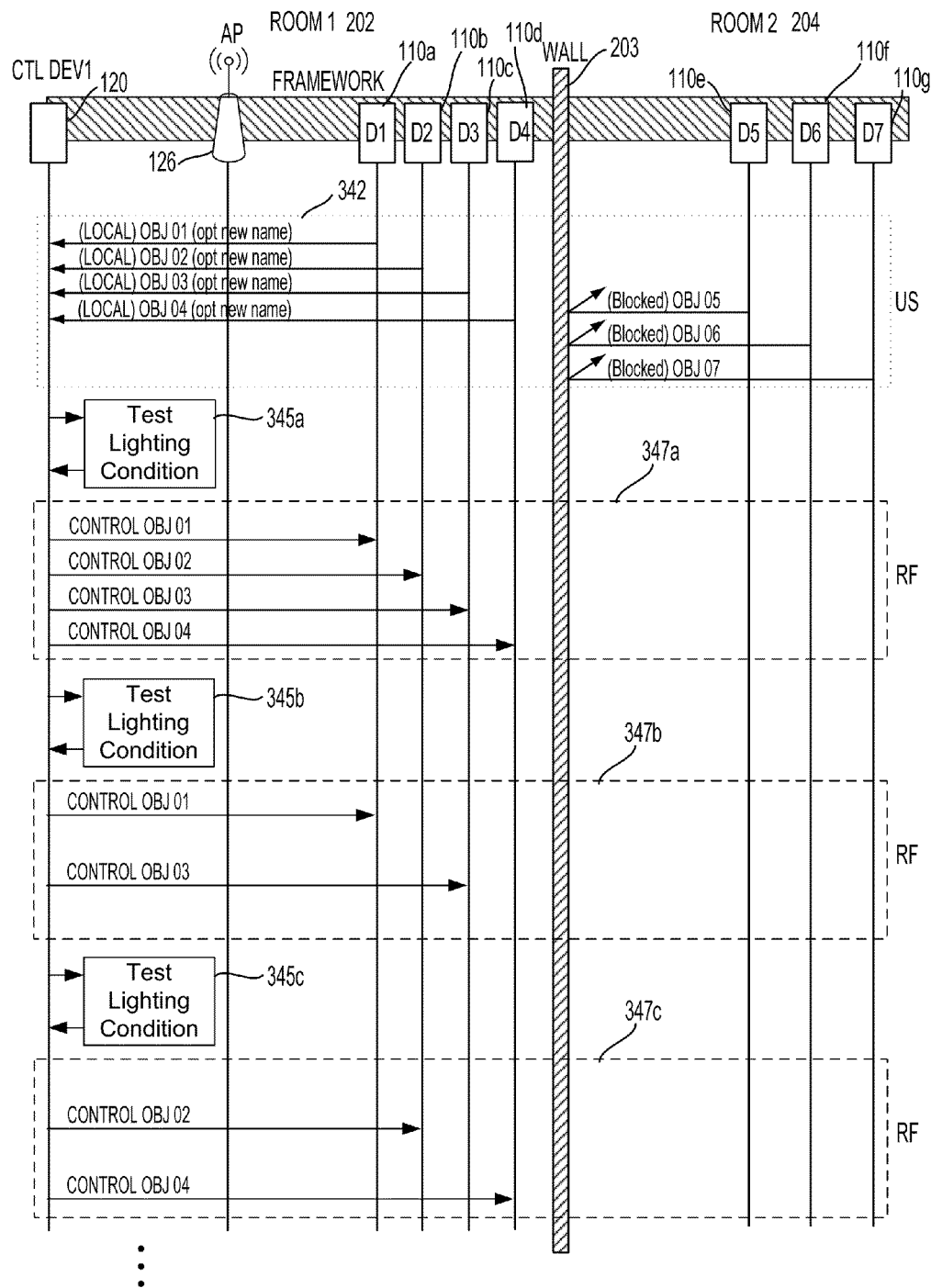
FIG. 3D is a message flow diagram illustrating communication interactions between a control device, access point, and smart lighting objects in different rooms for identifying smart lighting objects and controlling a lighting condition in an embodiment.

When the location or position of smart lighting objects is determined and a pointing direction of the control device is determined, the control device may be used to control individual devices through interaction by the control device testing lighting conditions to determine the smart lighting objects to control to achieve a desired effect as illustrated in FIG. 3D. As in previous examples, the smart lighting objects 110a-110d may transmit signals as previously described using the ultrasound communication channel and including the new name (e.g., AllJoyn® "friendly name") as shown in message sequence 342. The use of ultrasound signals may segregate the devices which are in the room, such as the smart lighting objects 110a-110d, from those that are not. The control device 120 may be used to perform an initial test of the lighting conditions in block 345a. The initial test in block 345a may include metering the light using a camera in the control device 120 and a light metering process or algorithm conducted in a processor of the control device 120. It may also be possible to offload processing of the metering condition in an external device through operation of the framework. In some embodiments, the metering may be used to determine an overall lighting condition. Alternatively, the metering may be used to determine the lighting contribution of each of the smart lighting objects 110a-110d to the lighting condition.

When the lighting condition has been tested in the initial test block 345a, the control device 120 may send control commands to individual ones of the smart lighting objects 110a-110d in message sequence 347a. The control commands in message sequence 347a may be sent on an RF communication channel associated with the framework. The control commands in the message sequence 347a may be used to control the lighting intensity of the corresponding ones of the smart lighting objects 110a-110d. The lighting condition may be tested, or testing of the lighting condition may continue in block 345b, where a further test may be conducted, such as through a metering process to determine the effect of the control commands sent in the message sequence 347a. The testing in block 345b may confirm certain lighting settings accomplished by the control commands in the message sequence 347a. For example, the control commands in the message sequence 347a may instruct certain ones of the smart lighting objects 110a-110d to increase, reduce, or disable their lighting output. The testing in block 345b may confirm that the commands were executed (e.g., one or more smart lighting object was disabled, dimmed, brightened, etc.) and may further determine the effect of these commands on the lighting condition.

When the lighting condition has been tested in the block 345b, the control device 120 may send further commands to selected ones of the smart lighting objects 110a-110d in a message sequence 347b. In the illustrated example, the control device 120 may send control commands to smart lighting object 110a and 110c in the message sequence 347b. However, in any message sequence or sequences, the control device 120 may send control commands to as many or as few, or none of the smart lighting objects 110a-110d depending on the results of the test in block 345b (or any test block). The lighting condition may be tested, or the testing of the lighting condition may continue in test block 345c, where a further test may be conducted, such as through a metering process to determine the effect of the control commands sent in the message sequence 347a. The testing in block 345c may confirm certain lighting settings accomplished by the control commands in the message sequence 347b. For example, the control commands in the message sequence 347b may instruct certain ones of the smart lighting objects 110a-110d to increase, reduce, or disable their lighting output (e.g., brightness, color, strobe effect, etc.). The testing in block 345c may confirm that the commands were executed (e.g., one or more smart lighting object was disabled, dimmed, brightened, etc.) and may further determine the effect of these commands on the lighting condition.

Using information gained from testing lighting conditions in the block 345c, the control device 120 may send further commands to selected ones of the smart lighting objects 110a-110d in a message sequence 347c. In the illustrated example, the control device 120 may send control commands to smart lighting object 110b and 110d in the message sequence 347c. However, in any message sequence or sequences, the control device 120 may send control commands to as many or as few, or none of the smart lighting objects 110a-110d depending on the results of the test in block 345c (or any test block). In some embodiments, the lighting condition may be tested in an iterative sequence of testing and control as described above. Further in some embodiments, the lighting condition may be continuously tested and controlled as conditions change such as changes to one or more of the position of the control device 120, the control device user 140, the subject 145, and so on.

A user interface that enables interactions with smart objects through pointing of the control device may use a table of relative or absolution locations of smart object by determining a pointing direction of the smart control device based on signals from an internal accelerometer, gyroscopes, or similar device. The determined pointing direction may be compared with the table of smart object IDs and relative bearings/locations to identify the smart object located close to the pointing direction. The ID for the identified smart object may be used to address an RF message sent via the networking framework, such as via an RF AllJoyn® network, to control that particular smart object. For example, from the user perspective, it appears that the user merely points their smartphone executing a control device application at the desired object and presses a virtual key on the touchscreen to interact with and control the object.

In the various embodiments, a user may interact with a smart lighting object by "pointing" a smart control device at a smart lighting object to identify and select the smart lighting object, send the smart lighting object individual control commands to adjust luminosity to achieve a desired lighting condition.

Figure 4A:
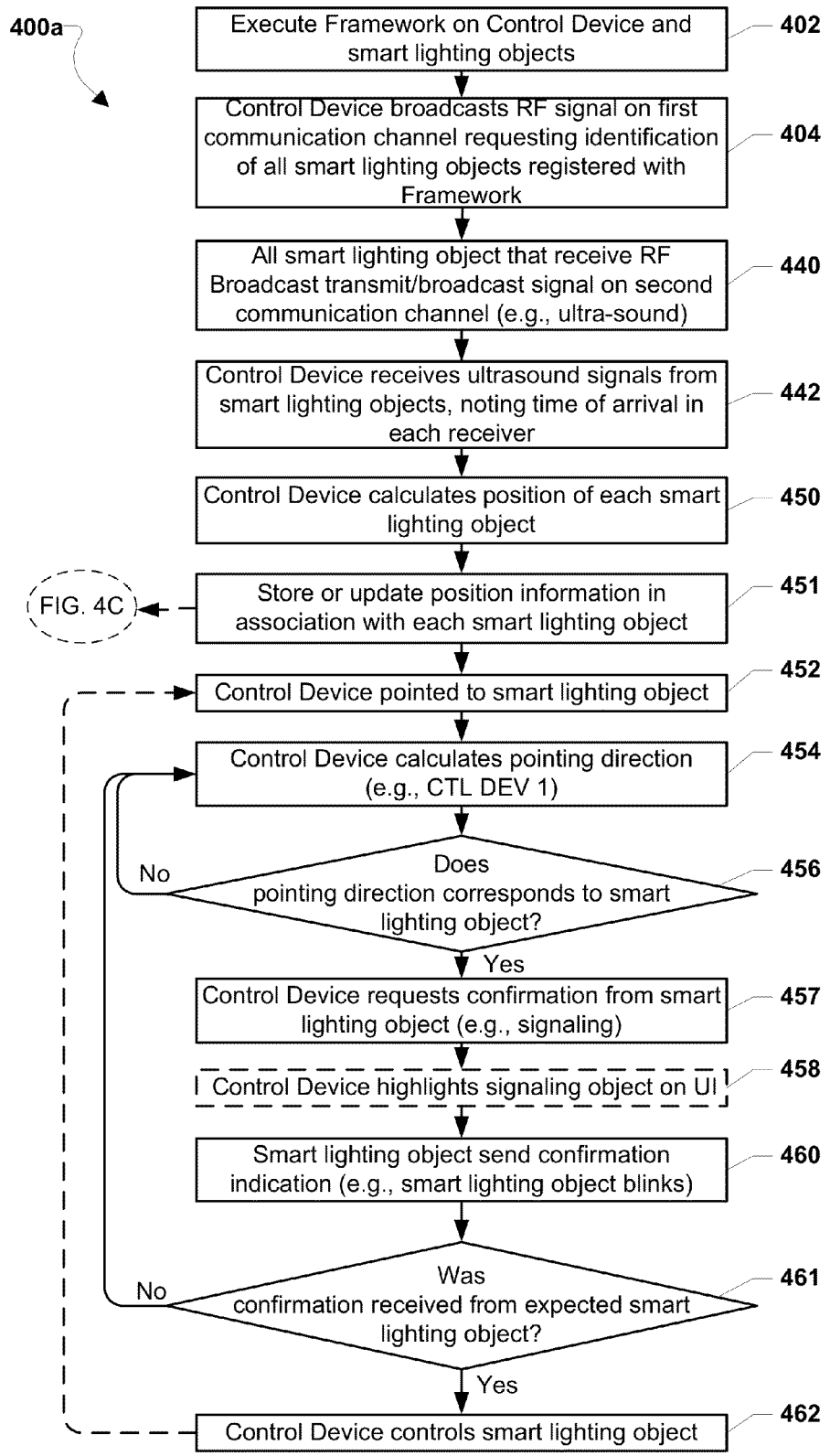
FIG. 4A is a process flow diagram illustrating an embodiment method for pointing and control of smart lighting objects.

An embodiment method 400a for controlling smart lighting objects to achieve a desired lighting condition is illustrated in FIG. 4A. To perform the operations of embodiment methods, a processor of the control device 120 may execute a networking framework standard client and the one or more smart lighting objects 110 may execute a networking framework thin client in block 402. In some embodiments, the networking framework standard client and networking framework thin client may be AllJoyn® clients and may be specified according to various standard code packages, APIs, SDKs or independently developed packages that are compliant with the current and future technical standards associated with the Allseen Alliance organization. A control device may broadcast an RF signal on a first communication channel, such as an RF channel, requesting identification of all smart lighting objects currently registered with the networking framework in block 404. The broadcast of the RF signal may be accomplished as a networking framework function that is invoked by an application, such as a framework application. The networking framework function, in turn, may invoke the necessary hardware and lower level software actions that may be necessary for actual transmission of the RF signal.

Depending on various implementations, the control device may send individual requests to smart lighting objects that have registered with the networking framework based on a previous discovery process conducted over the RF communication channel. Alternatively or in addition to individual requests, the broadcast RF signal may be broadcast to all smart lighting objects within a home or facility that are registered with the networking framework. In response to the RF signal (e.g., request) all of the smart lighting objects receiving the request may respond by transmitting a signal, such as an ultrasound signal, on a second communication channel, such as a sound or ultrasound channel, in block 440. The transmission of the response on the second communication channel may be accomplished directly as a networking framework function invoked by the networking framework thin client on each smart lighting object. Alternatively, the transmission on the response on the second communication channel may be accomplished, at least initially, outside the networking framework as an out-of-framework or out-of-band communication. Some or all portions of such an out-of-framework communication may be internalized into the networking framework upon receipt by the control device.

In block 442, the control device 120 may receive sound communication signals, such as ultrasound signals, from the smart lighting objects 110 on the second communication channel via a microphone. To enable pointing, the sound signals transmitted by the smart lighting objects 110 may be received through two or more microphones spaced apart on the control device 120.

In the various embodiment methods, the control device may be equipped with two or more ultrasound receiving elements, such as microphones, microphone elements or other transducer elements. In some embodiments, the control device may be provided with more than two microphones and may thereby be equipped to develop positions within a three-dimensional coordinate system. In other embodiments, the smart lighting objects may be provided with a capability to send and receive ultrasound signals such that the smart lighting objects may calculate their relative positions to each other.

In block 450, a processor of the control device may calculate a direction or relative bearing to each smart lighting object 110 based on the relative time of arrival of the sound signals between each microphone on the control device 120. The position, location, or bearings associated with a sound source may be determined through triangulation, trilateration, or similar computational methods. Triangulation is a simple trigonometric calculation based on factors such as the time differences between the relative times of arrival, distance between microphones, and so on. Once determined, the bearings towards or locations of the smart lighting objects may be stored in a database on the control device 120.

In some embodiments in which the smart control device has three or more microphone, a device processor may be configured with processor-executable instructions (i.e., software) to determine a three-dimensional direction or bearing from the control device to the smart lighting object. The determined bearing to each responding smart object may be correlated to or stored with the list or subset of nearby smart objects stored in a memory of the control device 120 or in a memory accessible to the control device 120 (e.g., a memory accessible via a network or the Internet). The operations of querying smart objects, receiving sound signals and building a table of their IDs and relative bearings stored in memory of the control device 120 may be repeated frequently so that the relative bearings may be updated or confirmed as the user moves around. In the various embodiments, a processor of the control device 120 may use relative bearings received as the user moves around a room to build a table of the locations (e.g., coordinates in three-dimensional space) of the smart objects within the room. Using a table of the locations of the smart objects, a processor of the control device 120 may calculate the directions/relative bearings to each smart object based on its current location in the room and additional information such as pointing direction of the control device 120.

In block 451, the position information associated with each smart lighting object 110 may be stored or updated in memory. In some embodiments, the position information may be stored locally in a memory of the control device 120. In other embodiments, the position information of each of the smart lighting objects 110 may be stored or updated in one or more of the smart lighting objects 110. In other embodiments, the position information of the smart lighting objects 110 may be stored in an element, such as a server, accessible to the network in which the control device 120 and the smart lighting objects 110 are operating.

In block 452, a user of the control device 120 may point the control device 120 in a particular direction corresponding to one of the smart lighting objects 110 that the user wishes to control. For example, the control device 120 may be pointing in a direction that corresponds to more than one smart lighting object 110. In such an example, the control device 120 may use additional information, such as a name of the smart lighting object, to select the correct smart lighting object 110 for control. Further, a confirmation action, such as a blinking action may be used to ensure that the correct smart lighting object 110 will be controlled based on the pointing direction of the control device.

In block 454, a processor of the control device may determine the orientation of the control device in order to identify a smart lighting object 110 at which the control device 120 is pointing (if any), or to provide an input to the location calculation of the smart lighting objects 110. The orientation may be determined by the processor based on information from accelerometers or gyroscopes within the control device 120. In other examples, the smart lighting objects 110 may receive sound signals from other smart objects and provide relative position calculations in order to more fully develop location profiles of objects within a space.

When a pointing direction is calculated, the control device processor may determine whether the calculated pointing direction of control device corresponds to a bearing towards or position of a smart lighting object in determination block 456. When the calculated pointing direction does not correspond to a bearing or position of a smart lighting object (i.e., determination block 456="No"), the control device processor may continue to calculate or update the pointing direction in block 454.

When the calculated pointing direction corresponds to a bearing towards or position of a smart lighting object (i.e., determination block 456="Yes"), the control device may send a signal to the smart lighting object via the first (i.e., RF) communication channel using the address or name of the corresponding object requesting the object to confirm its identity in block 457. Such a confirmation request may be a request that the smart lighting object emit a sound or visible signal to enable the control device and/or the user to confirm whether the smart lighting object towards which the control device is pointing actually corresponds to the smart lighting object targeted for interaction by the user of the control device. The smart lighting object may optionally be highlighted on the user interface of the control device in block 458 to aid the user in making this confirmation. In response to receiving the confirmation request, the smart lighting object may provide a confirmation indication in block 460.

The confirmation indication may include blinking for a smart light bulb, emitting a tone for a device capable of producing sound, or other confirmation or combination of confirmations. The confirmation may include a signal on a secondary communication channel such as an ultrasound channel that provides information about the device such as an identification number, name, friendly name or other means of identification. By receiving a visible or audible confirmation, the user is able to visually or audibly confirm that the device being pointed to is the device targeted or addressed for control.

In some embodiments, the pointing and confirmation procedure may be used during naming of the smart lighting objects. In such an example, a user may point a control device to a smart lighting object, confirm the device to which the user is pointing corresponds to a highlighted object displayed with its generic name and rename the smart lighting object.

In determination block 461, a processor of the control device may determine whether a received confirmation signal indicates that the smart lighting object at which the device is pointing corresponds to the same smart lighting object in a database stored in or available to the control device. This confirmation may be accomplished by sensing by a camera of the control device a flashing light close to a centerline of the field of view, by determining (e.g., by triangulation) from received sound that the source is in front of the control device, by receiving a confirmatory user input, and combinations of such indications. When such confirmation is not successful (i.e., determination block 461="No"), the control device may repeat the process to calculate or update the pointing direction in block 454 and select another smart lighting object from the database as correlated to the pointing direction of the control device in determination block 461. When the control device processor determines that the confirmation signal received is from the expected device (i.e., determination block 461="Yes"), the control device may begin controlling the smart lighting object by sending communications via the networking framework in block 462. For example, the control device may send commands via the networking framework to particular smart lighting objects to achieve a desired lighting effect as described below. As another example, the control device may send commands via the networking framework to rename smart lighting objects.

Figure 4B:
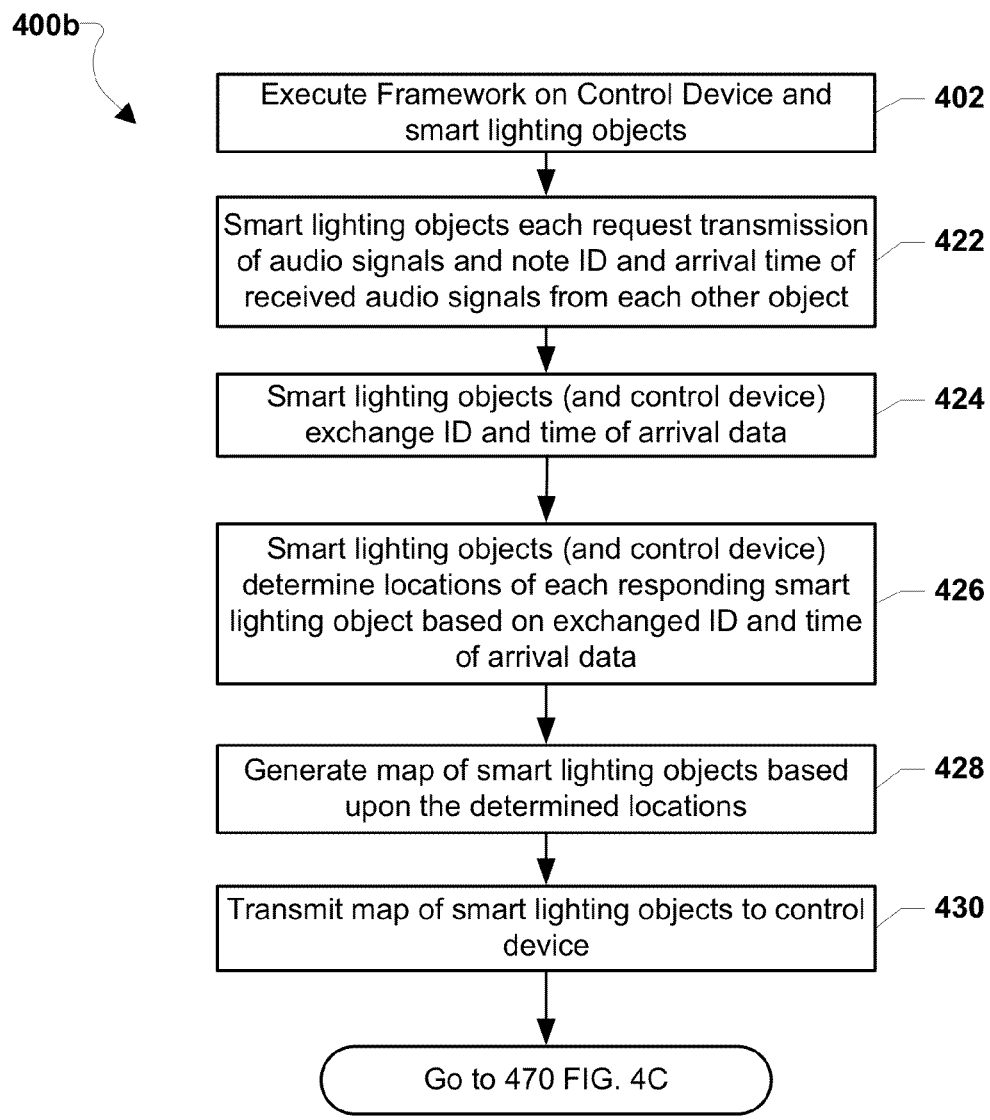
FIG. 4B is a process flow diagram illustrating an embodiment method for inter-object location determination for smart lighting objects.

Instead of the control device and its processor discovering the locations of smart lighting objects as described above, the smart lighting objects may coordinate actions through communications via RF and sound communication channels to determine their own locations, and report that information to the control device via the networking framework. This embodiment is illustrated in FIG. 4B which illustrates alternative embodiment method 400b. In block 422, each of the smart lighting objects may request transmission of an audio signal (e.g., ultrasound) from each other. The smart lighting objects may receive the transmitted audio signals from the other devices including the ID of the other smart lighting objects. Each device may calculate a time of arrival and other information about the received audio signals.

In block 424, the time of arrival data and other information, such as the ID of each smart lighting object, may be exchanged between the smart lighting objects. This exchange of information may be conducted directly between the smart lighting objects through an RF communication channel of the networking framework or through a secondary communication channel such as an ultrasound communication channel.

Alternatively or in addition, the exchanged time-of-arrival/flight and ID information may be collected in a network element, such as a server.

In block 426, the locations of each of the smart lighting objects responding to the requests may be determined based on the exchanged ID and time-of-arrival/time-of-flight data. For example, each of the smart lighting objects may construct a table of relative locations of other smart lighting objects determined from the received ID and time-of-arrival/time-of-flight information. Alternatively or in addition, a network element, such as a server, may make relative location determinations by processing the ID and time-of flight information from each of the smart lighting objects, and construct a data table or tables of absolute or relative locations for each of the smart lighting objects. The relative location table or tables may be sent to the smart lighting objects and the control device via the network framework.

In block 428, based on the ID and relative location information developed in any of the above described examples, a map (e.g., a data base of locations) of the location of the smart lighting objects may be generated by one or more of the smart lighting objects, or another network element, such as a server. The map may be a 2D or 3D map.

In block 430, the generated map may be transmitted to the control device 120, such as via the networking framework. The control device may use the map along with information about the current position of the control device 120 to determine the relative bearings to or positions of the smart lighting objects. The relative position of the smart lighting objects may be used for purposes related to control of the objects by the control device, such as to affect a desired lighting condition as described below.

Figure 4C:
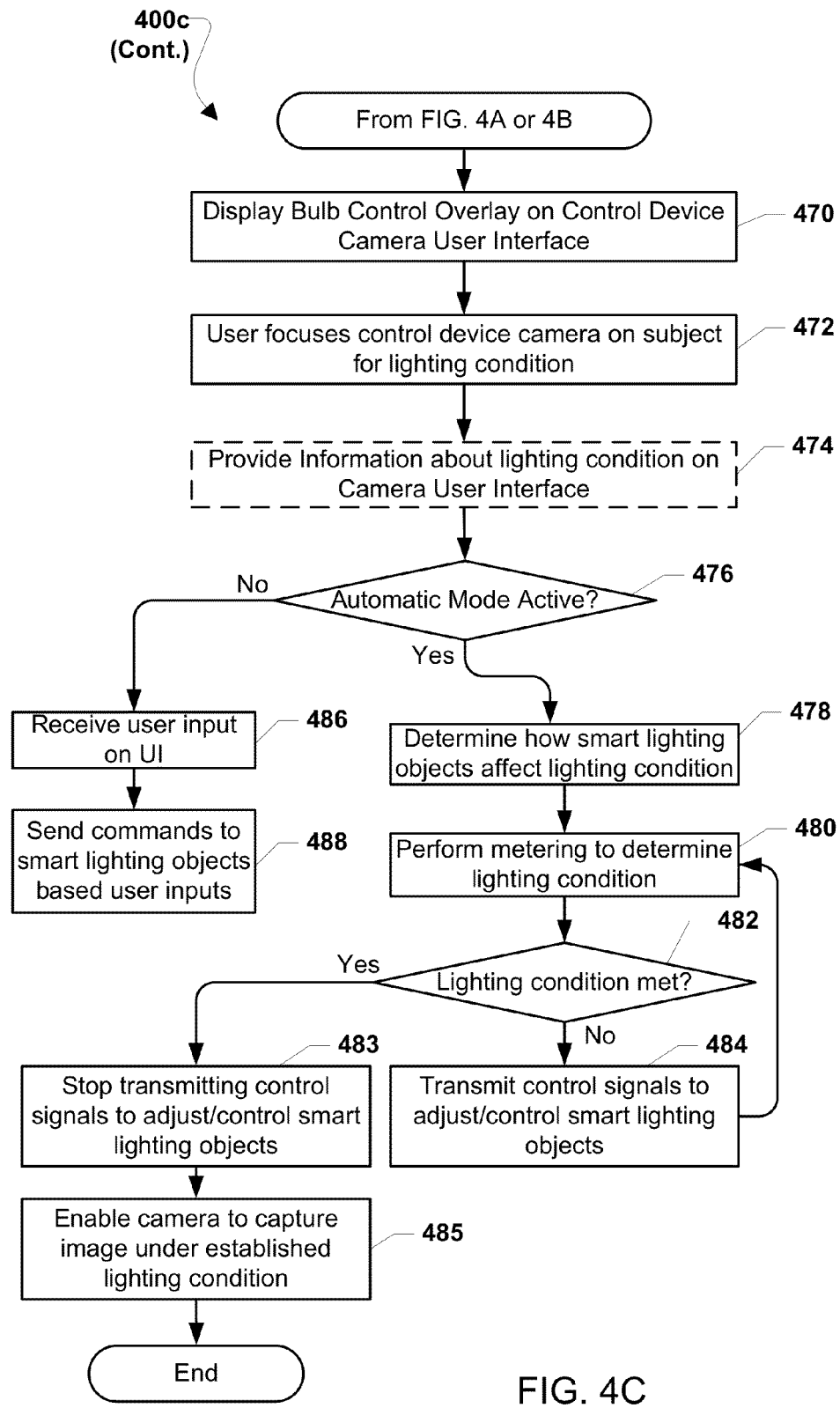
FIG. 4C is a process flow diagram illustrating an embodiment method for controlling a lighting condition by automatically or manually controlling smart lighting objects via a control overlay.

FIG. 4C illustrates in embodiment method 400c further operations that may be performed when the processor of the control device is informed of the smart lighting object relative bearings or locations in order to achieve a desired lighting condition.

In block 470, using the position information generated or received by the control device, such as a transferred 2D or 3D map, a processor of the device may generate a bulb control overlay that is be displayed on a user interface of the control device that includes interactive icons corresponding to smart lighting objects. The control overlay may be displayed for example on the camera display portion of the user interface of the control device. In some embodiments, the control device may be pointed toward a subject or an area of a room where a lighting condition is to be established in block 472. As the pointing direction is changed, the relative position of the interactive icons on the overlay may also change such that the icons display the approximate current relative position of the controllable smart lighting objects with regard to the scene to which the control device is pointing.

When the control device is pointing towards the desired subject or scene, optional information about the current lighting condition may be displayed or otherwise provided on the control device user interface (e.g., a camera user interface) in block 474. Lighting condition information may include information about brightness, hue, etc. of the current lighting condition observed by the control device camera. The lighting condition information may further display a list of possible pre-determined lighting conditions. The pre-determined lighting condition that is closest to the observed condition may be highlighted or indicated and the user may select a pre-determined lighting condition different from the current condition. Other interface approaches are possible such as sliders or other interactive control objects, which may allow the user of the control device to make adjustments to the smart lighting objects based on setting the slider or sliders to different positions.

In determination block 476, the control device processor may determine whether the control device is in an automatic mode in which it should automatically control smart lighting objects, or in a manual mode in which it should receive user inputs and enable manual control of smart lighting objects. When the processor determines that it is not in the automatic mode (i.e., determination block 476="No"), control device may receive user inputs on the user interface in block 486, and send corresponding commands to the smart lighting objects via the networking framework in block 488 to enable manual control. Thus, the control device may function as a user interface to enable smart lighting objects to be controlled manually through manipulation of one or more of the interactive icons in the control overlay displayed on the device. Further, the manual mode may allow for manual manipulation of camera settings, such as ISO, aperture, shutter speed, and so on.

When the automatic mode is active (i.e., determination block 476="Yes"), the processor of the control device may determine the smart lighting objects that can affect the lighting conditions on the subject or scene on which the camera is focused in block 478. Alternatively or in addition, a degree of effect of or contribution to the lighting condition for each of the smart lighting objects may be determined in block 478. In block 480, the control device processor may perform light metering of the object or scene on which the camera is focused to determine the current lighting condition.

In determination block 482, the control device processor may determine whether the current lighting conditions meet the desired lighting conditions. For example, the processor may compare the amount of light detected in block 480 with a minimum amount of light required to achieve a quality photograph or image capture operation. As another example, the processor may compare the brightness, direction of the illumination (or locations of shadows) and/or colors to desired lighting conditions to achieve a particular photographic effect.

In response to determining that the current lighting condition meets the desired lighting conditions (i.e., determination block 482="Yes"), the control device processor may discontinue adjusting the lighting effects (e.g., stop sending control signals to the smart lighting objects) in block 483. In the various embodiments, by stopping the transmission of control signals to the smart lighting objects, the smart lighting objects may maintain or "hold" the present lighting settings in order to preserve the established lighting conditions. In some embodiments, the smart lighting objects may need to be periodically refreshed to maintain the established settings.

In block 485, the control device processor may enable the camera to capture an image under the established lighting condition. For example, the control device processor may trigger the camera to take a photograph, such as by sending a message to the camera or otherwise activating the camera and/or camera circuitry for image capture. Alternatively or in addition, in the automatic mode, one or more camera settings (e.g., ISO, aperture, shutter speed, etc.) may be automatically adjusted to achieve a photographic result. The camera settings may be automatically adjusted independently or together with the lighting conditions to achieve the desired lighting condition. Alternatively, the lighting condition may be adjusted based on (or taking into account) one or more fixed camera settings, such as where one or more settings (e.g., ISO, aperture, shutter speed) is set according to priority and the lighting condition and other adjustable camera settings are automatically controlled to achieve the desired lighting condition.

In response to determining that the current lighting conditions do not meet the desired lighting condition (i.e., determination block 482="No"), the control device processor may transmit control commands, messages, signals, or similar communications to selected smart lighting objects to adjust their respective illumination levels in block 484. The control commands may be transmitted on an RF channel associated with the networking framework as described herein. After a short pause to enable the smart lighting objects to adjust their luminosity, the control device processor may again perform metering in block 480 to determine the current lighting condition, and again determine whether the current lighting condition meets the desired lighting condition in determination block 482. In this manner, the control device processor may adjust the lighting output of individual smart lighting objects and test the lighting conditions in a control loop until the desired lighting condition is achieved.

Figure 5A:
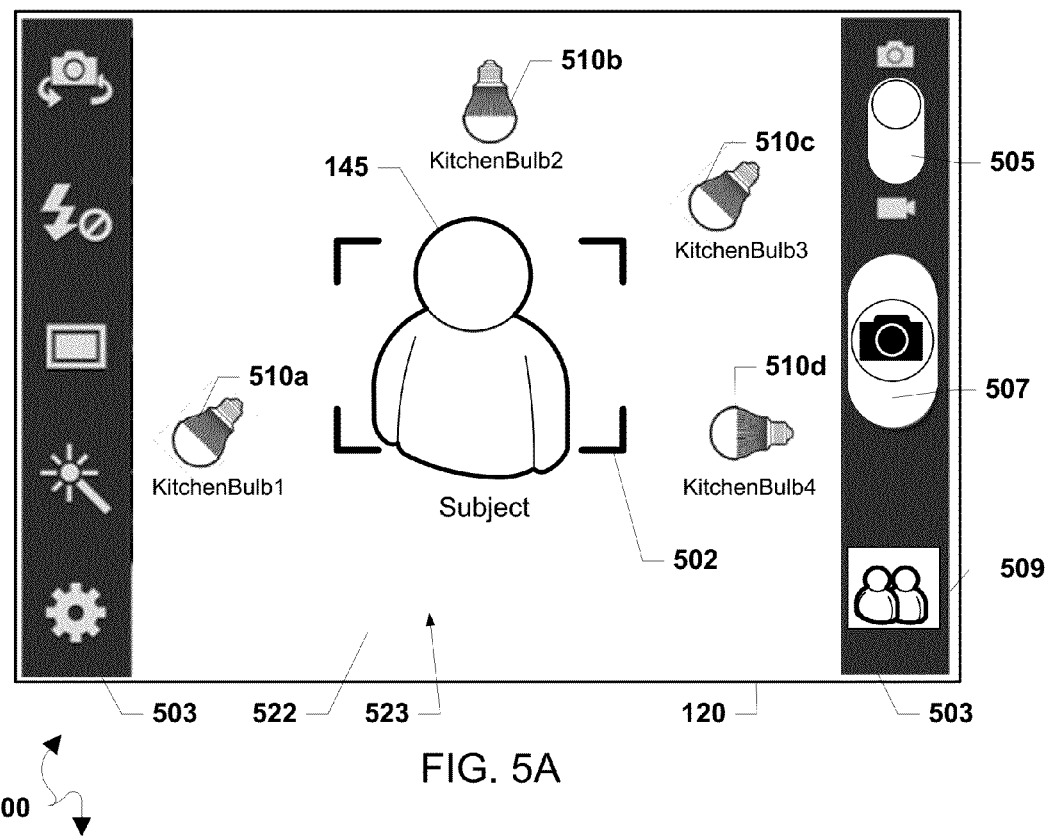
FIG. 5A is a diagram illustrating an embodiment control overlay identifying smart lighting objects suitable for use with the various embodiments.
Figure 5B:
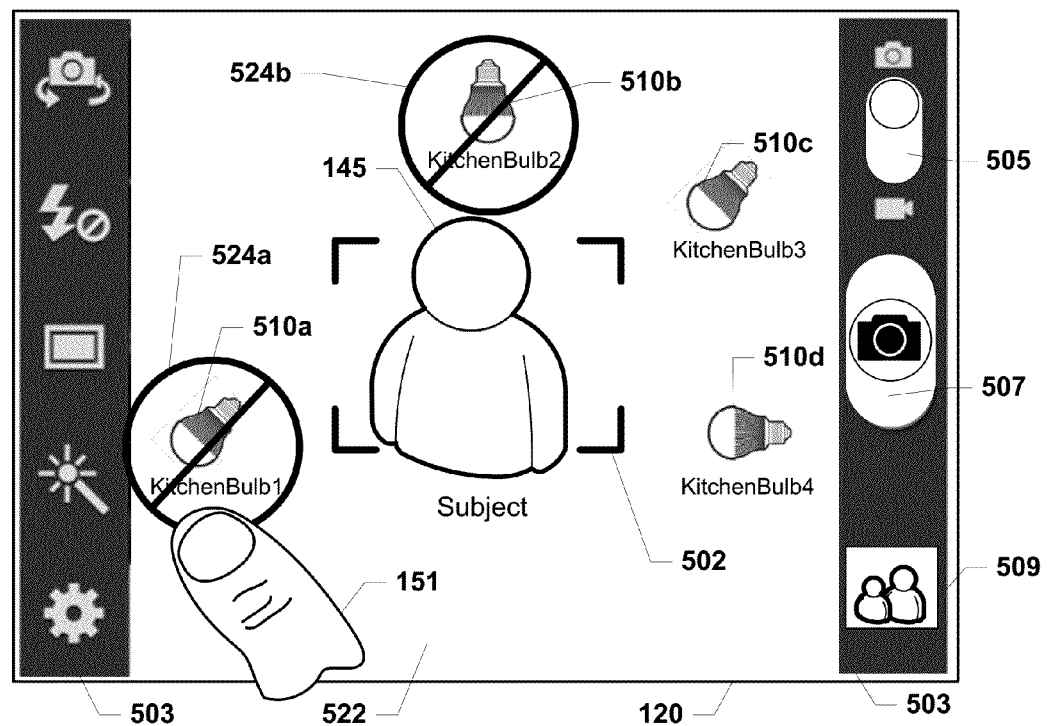
FIG. 5B is a diagram further illustrating an embodiment control overlay identifying smart lighting objects suitable for use with the various embodiments.

The control device may present a user interface (UI) display through which the user may send commands for controlling smart lighting objects, an example embodiment control overlay 500 of which is illustrated in FIG. 5A and FIG. 5B.

In some embodiments illustrated in FIG. 5A, a control device 120 may be equipped with a display 522, which may be one of a variety of displays such as an LED, LCD, or similar display. The display 522 may be configured to be touch sensitive, such as through a capacitive touch sensor circuit (not shown), or other touch sensitive mechanism. The display 522, as a touch sensitive display, may be configured such that various positions on the display 522 may be activated when a user makes contact with those portions with a finger, body, stylus or other device capable of activating the touch screen. The control device 120 may be configured to provide a user interface 523 on the display 522. The user interface 523 may be a combination of display portions and active portions with which a user may interact.

The user interface 523 may include interaction panels 503, which may contain interactive objects for controlling various functions of the control device 120. In the example illustrated in FIG. 5A, the user interface 523 may correspond to a camera user interface, which may be displayed by the control device when an application that makes use of the camera is active. The interaction panels 503 may therefore display objects relevant to controlling the camera of the control device 120. Though not specifically shown, the controls may further include controls for ISO (i.e., light sensitivity), shutter speed, focal length, aperture (e.g., F-stop, etc.), each of which alone or in combination may affect the lighting conditions within a photograph or video.

The interaction panels 503 may include a camera mode video mode switch 505, a camera activation control 507, and a previous picture display 509. The user interface 523, in the camera user interface mode, may include a graticule, reticle frame capture indicator, or similar indicator 502. The indicator 502 may indicate the relative position of the subject 145 relative to the center and the boundaries of the frame to be captured when the camera is activated, such as through operation of the camera activation control 507. The interaction panels 503 may include a variety of additional controls or "widgets" (e.g., flash control, settings, etc.) that allow various functions to be invoked through interaction with the touch screen of the display 522.

In various embodiments, the user interface 523 may be provided with an overlay that includes interactive icons 510a, 510b, 510c, and 510d, which correspond to smart lighting objects in the room. The overlay may indicate the relative positions of the smart lighting objects represented by the interactive icons 510a, 510b, 510c, and 510d by positing the interactive icons in locations on the user interface 523 that approximate the actual position of the smart lighting objects in the scene.

Other information may be provided about the smart lighting objects through the interactive icons 510a, 510b, 510c, and 510d such as an object name, a pointing direction of the object, object capabilities, etc. Additional information may be accessed through interactions with the interactive icon such as by clicking on a menu or select box associated with the icon and the underlying smart lighting object. Additional information may include help for operating the object, an expected life of the object, colors capable of being produced by the object, and so on.

In addition, characteristics of the interactive icons, such as color, brightness, blinking, or similar characteristics may be changed to indicate certain conditions. For example, one of the smart lighting objects, such as the smart lighting object that corresponds to interactive icon 510a (e.g., "KitchenBulb1"), may be considered as not affecting the lighting condition. In response, the corresponding interactive icon 510a for the smart lighting object may be provided with a corresponding characteristic (e.g., "grayed out") indicating the lighting condition effectiveness or lack of effectiveness.

As illustrated in FIG. 5B, the control device user 140 may use a finger 151 to interact with one or more of the interactive icons 510a-510d. For example, the user may manually disable the smart lighting object corresponding to interactive icon 510a (e.g., "KitchenBulb1"). The overlay may be updated to show that "KitchenBulb1" is disabled by displaying an indicator 524a on the user interface 523. Similarly, a determination may be made that the smart lighting object that corresponds to the interactive icon 510b (i.e., "KitchenBulb2"), will have an adverse effect on the lighting condition by pointing directly into the camera. The control device user 140 may manually disable the smart lighting object named "KitchenBulb2", and an indicator 524b may be provided on user interface 523 in connection with the overlay. The indicator 524b may be displayed over the interactive icon to show that the corresponding smart lighting object has been disabled.

In some embodiments, when smart lighting objects are controlled automatically, the interactive icons 510a-510d may be updated to reflect the current status of the smart lighting objects. A user may interact with one or more of the interactive icons 510a-520d even after automatic configuration has been performed and vice versa; the control device user 140 may perform manual control on some or all of the objects, and subsequently invoke automatic control of the objects. In some embodiments, the initial conditions of the smart lighting objects may be restored after a control session is completed or a pre-determined lighting condition may be set.

The control device 120 may further invoke an automatic control schedule to set up lighting conditions for various times. The control device may be configured to detect ambient conditions such as a level of outside light and may make period adjustments to the lighting condition based on detected changes to the outside light levels. Alternatively, the control device 120 may detect a change in lighting condition such as drawing down blinds, which has a darkening effect in the room and make appropriate adjustments.

Figure 6:
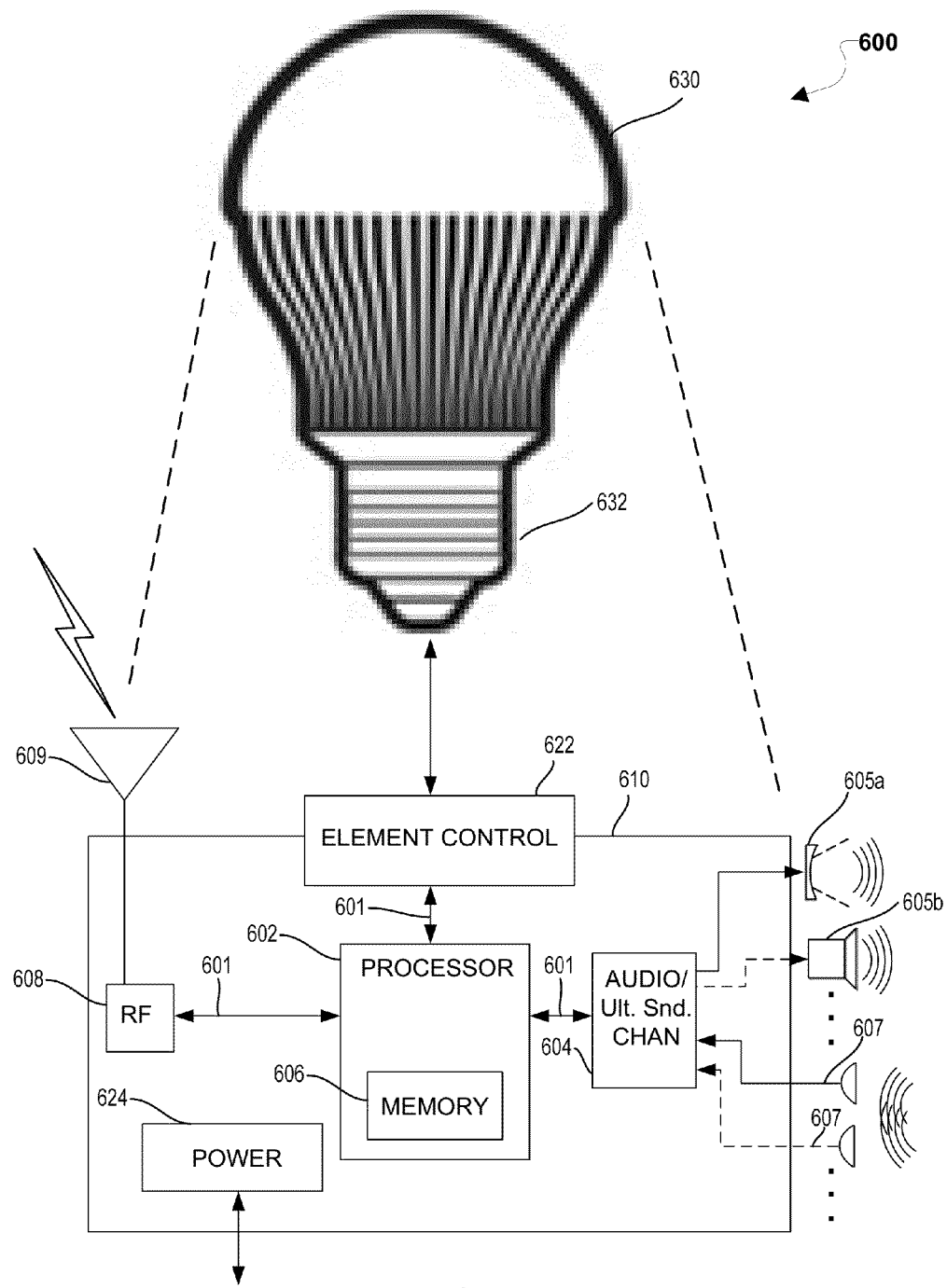
FIG. 6 is a component diagram of an example smart lighting object suitable for use with the various embodiments.

The devices or smart lighting objects described herein may be virtually any device having the capability of connecting to a network and providing a secondary communication channel, such as an ultrasound channel. However, in the various embodiments for controlling a lighting condition, as illustrated in FIG. 6, the device or smart lighting object may include a smart lighting object 600, such as a smart bulb. The smart lighting object 600 may include a lighting element 639 such as a light emitting diode (LED) element, which may be controllable, such as through the lighting element control unit 622. In some embodiments, the smart lighting object 600 may include a base 632 for inserting the smart lighting object 600 into a socket or receptacle (not shown). The base 632 may be any of a wide variety of bulb base types such as screw type bulb bases that are well known to those of skill in the art. The base 632 may also be a non-standard or proprietary base. The socket or receptacle typically provides a source of power, generally alternating current (AC) power by which the smart lighting object 600 may obtain power to operate the lighting element 639.

The smart lighting object 600 may be equipped with a control unit 610, which may include at least a processor 602 and memory 606, an RF unit 608, an audio/ultrasound unit 604, a lighting element control unit 622, and a power unit 624. The various units within the control unit 610 may be coupled through connections 601. The connections 601 may be a bus configuration that may include data lines, control lines, power lines, or other lines or a combination of lines.

The processor 602 may be configured with processor-executable instructions to execute at least a thin client version of the framework to control the operation of, receive status from, and perform other operations using the connection 601. The processor 602 may be an embedded processor or controller, a general purpose processor, or similar processor and may be equipped with internal and/or external memory 606. The internal/external memory 606 may be volatile or non-volatile memory, and may also be secure and/or encrypted memory, or unsecure and/or unencrypted memory, or any combination thereof.

The RF unit 608 may have one or more radio signal transceivers (e.g., Peanut, Bluetooth, Bluetooth LE, Zigbee, Wi-Fi, RF radio, etc.) and may be coupled to or incorporate an antennae 609, for sending and receiving communications. The transceivers of the RF unit 608 may be coupled to each other and/or to the processor 602. The transceivers of the RF unit 608 and the antennae 609 may be used with the above-mentioned circuitry to implement the various wireless transmission protocol stacks and interfaces and may be controllable by at least a thin client version of the framework.

The audio/ultrasound unit 604 may include an ultrasound emitter 605a for transmitting ultrasound signals as described herein in connection with a second communication channel. Alternatively or in addition, the audio/ultrasound unit 604 may include a speaker or transducer 605b capable of transmitting ultrasound and/or audio signals. In some embodiments, the audio/ultrasound unit 604 may further include one or more ultrasound receivers 607 for receiving ultrasound signals. In embodiments in which the smart lighting object 600, or any smart lighting object, is provided with ultrasound receivers, the processor 602 and the receivers may be configured to assist in developing position information for the smart lighting objects.

Figure 7:
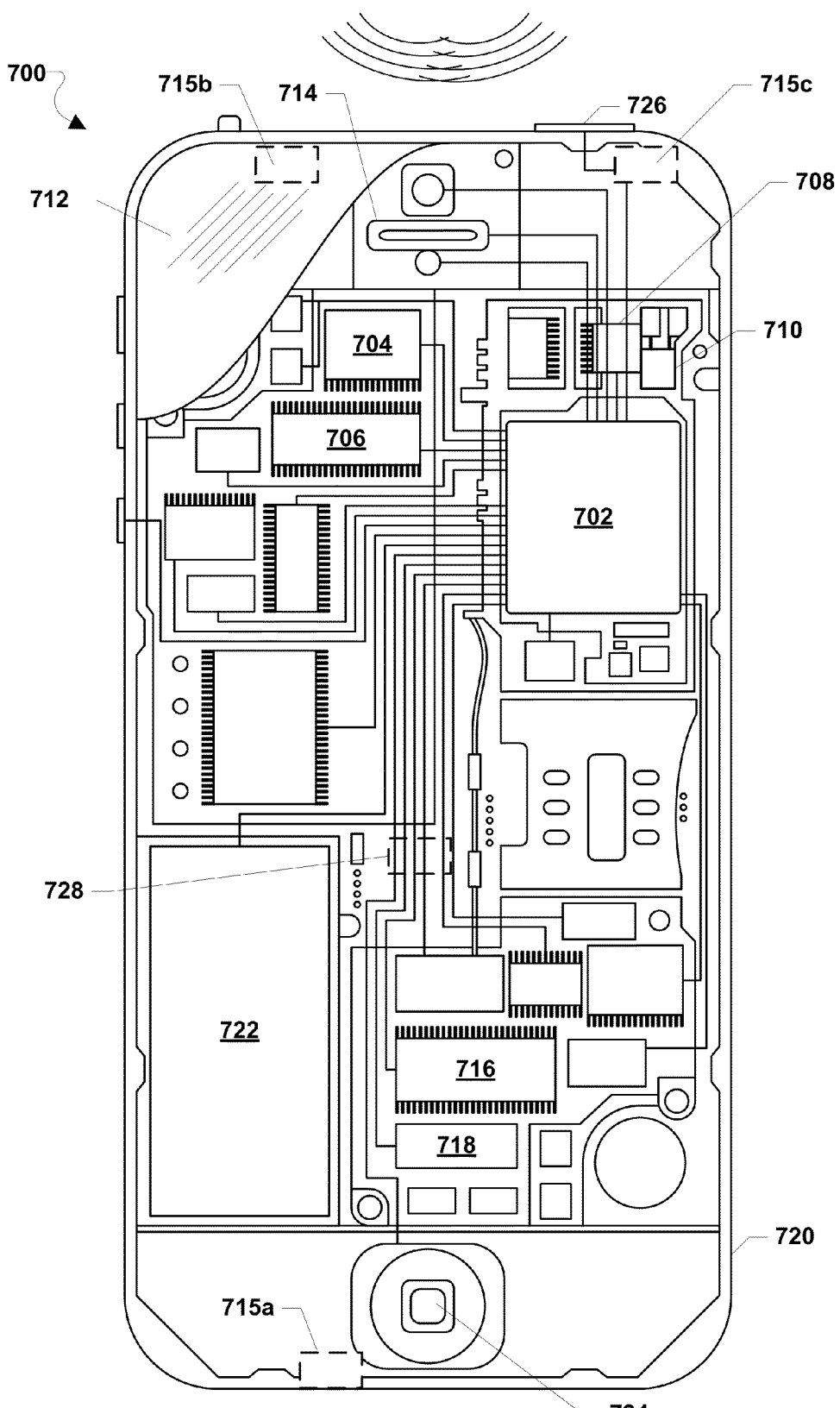
FIG. 7 is a component diagram of an example mobile computing device suitable for use with the various embodiments.

The various aspects may be implemented in any of a variety of mobile computing devices (e.g., smartphones, tablets, etc.) an example of which is illustrated in FIG. 7. The mobile computing device 700 may include a processor 702 coupled the various systems of the mobile computing device 700 for communication with and control thereof. For example, the processor 702 may be coupled to a touch screen controller 704, radio communication elements, speakers and microphones, and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. In another embodiment (not shown), the mobile computing device 700 may also be coupled to an external memory, such as a external hard drive.

The touch screen controller 704 and the processor 702 may also be coupled to a touch screen panel 712, such as a resistive-sensing touch screen, capacitive-sensing touch screen, infrared sensing touch screen, etc. Additionally, the display of the mobile computing device 700 need not have touch screen capability. The mobile computing device 700 may have one or more radio signal transceivers 708 (e.g., Peanut, Bluetooth, Bluetooth LE, Zigbee, Wi-Fi, RF radio, etc.) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

In some embodiments, the mobile computing device 700 may include microphones 715. For example, the mobile computing device may have a conventional microphone 715a for receiving voice or other audio frequency energy from a user during a call. The mobile computing device 700 may further be configured with additional microphones 715b and 715c, which may be configured to receive audio including ultrasound signals. Alternatively, all microphones 715a, 715b, and 715c may be configured to receive ultrasound signals. The microphones 715 may be piezo-electric transducers, or other conventional microphone elements. Because more than one microphone 715 may be used, relative location information may be received in connection with a received ultrasound signal through various triangulation methods. At least two microphones 715 configured to receive ultrasound signals may be used to generate position information for an emitter of ultrasound energy.

The mobile computing device 700 may also include speakers 714 for providing audio outputs. The mobile computing device 700 may also include a housing 720, constructed of a plastic, metal, or a combination of materials, for containing all or some of the components discussed herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

In some embodiments, the mobile computing device 700 may further include an accelerometer 728, which senses movement, vibration, and other aspects of the device through the ability to detect multi-directional values of and changes in acceleration. In the various embodiments, the accelerometer 728 may be used to determine the x, y, and z positions of the mobile computing device 700. Using the information from the accelerometer, a pointing direction of the mobile computing device 700 may be detected.

Figure 8:
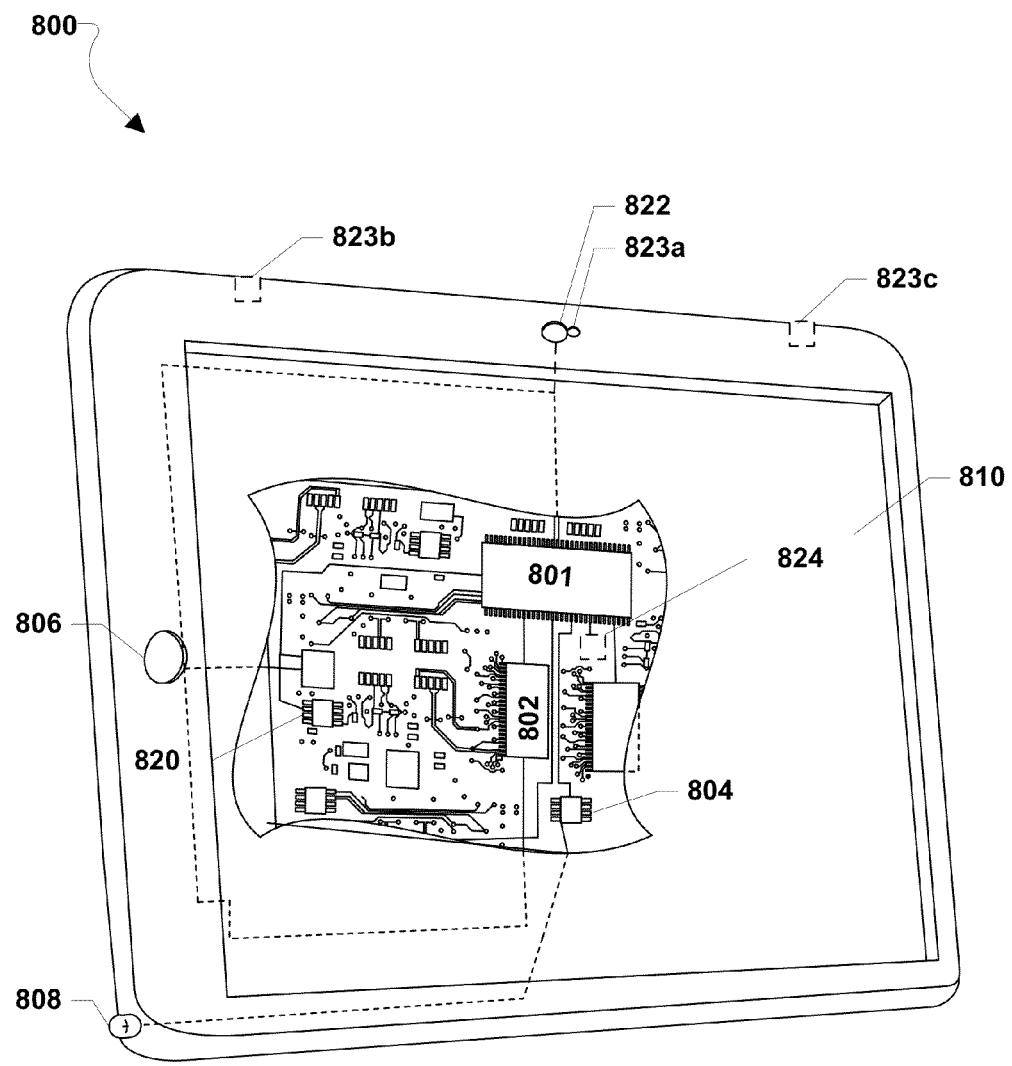
FIG. 8 is a component diagram of an example tablet mobile computing device suitable for use with the various embodiments.

The various embodiments may be implemented in any of a variety of tablet mobile computing devices, an example of which is illustrated in FIG. 8. For example, a tablet mobile computing device 800 may include a processor 801 coupled to internal memory 802. The internal memory 802 may be volatile or non-volatile memory, and may also be secure and/or encrypted memory, or unsecure and/or unencrypted memory, or any combination thereof. The processor 801 may also be coupled to a touch screen display 810, such as a resistive-sensing touch screen, capacitive-sensing touch screen infrared sensing touch screen, etc. The tablet mobile computing device 800 may have one or more radio signal transceivers 804 (e.g., Peanut, Bluetooth, Zigbee, WiFi, RF radio) and antennas 808 for sending and receiving wireless signals as described herein. The transceivers 804 and antennas 808 may be used with the above-mentioned circuitry to implement the various wireless transmission protocol stacks and interfaces. The tablet mobile computing device 800 may include a cellular network wireless modem chip 820 that enables communication via a cellular network. The tablet mobile computing device 800 may also include a physical button 806 for receiving user inputs. The tablet mobile computing device 800 may also include various sensors coupled to the processor 801, such as a camera 822, a microphone or microphones 823, and an accelerometer 824.

For example, the tablet mobile computing device 800 may have a conventional microphone 823*a* for receiving voice or other audio frequency energy from a user during a call or other voice frequency activity. The tablet mobile computing device 800 may further be configured with additional microphones 823*b* and 823*c*, which may be configured to receive audio including ultrasound signals. Alternatively, all microphones 823*a*, 823*b*, and 823*c* may be configured to receive ultrasound signals. The microphones 823 may be piezo-electric transducers, or other conventional microphone elements. Because more than one microphone 823 may be used, relative location information may be received in connection with a received ultrasound signal through various methods such as time of flight measurement, triangulation, and similar methods. At least two microphones 823 that are configured to receive ultrasound signals may be used to generate position information for an emitter of ultrasound energy.

Also in some embodiments, the tablet mobile computing device 800 may further include the accelerometer 824 which senses movement, vibration, and other aspects of the tablet mobile computing device 800 through the ability to detect multi-directional values of and changes in acceleration. In the various embodiments, the accelerometer 824 may be used to determine the x, y, and z positions of the tablet mobile computing device 800. Using the information from the accelerometer 824, a pointing direction of the tablet mobile computing device 800 may be detected.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart lighting objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart lighting objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for controlling a lighting condition by a control device, comprising:
    executing a networking framework on the control device;
    broadcasting a radio frequency (RF) signal on an RF communication channel associated with the networking framework from the control device for reception by a plurality of smart lighting objects registered with the networking framework, wherein each of the plurality of smart lighting objects is assigned an identifier within the networking framework, wherein the RF signal is configured to cause each of the plurality of smart lighting objects to transmit an ultrasound signal including the assigned identifier;
    receiving ultrasound signals from a subset of the plurality of smart lighting objects in the control device via two or more ultrasound microphones;
    determining a range and a direction to each of the subset of the plurality of smart lighting objects from which ultrasound signals were received based on reception times of the ultrasound signals by each of the two or more ultrasound microphones;
    generating a three dimensional map of locations of the subset of the plurality of smart lighting objects from which ultrasound signals were received based on the determined range and the determined direction; and
    controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition.

2. The method of claim 1, further comprising presenting a user interface including a camera image showing a current lighting condition on a display of the control device, wherein the user interface includes control objects associated with the subset of the plurality of smart lighting objects from which ultrasound signals were received and wherein the control objects are presented on the camera image based on their location identified in the three dimensional map.

3. The method of claim 2, wherein controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition comprises receiving a user input based on the presented camera image showing the current lighting condition and an interaction with one of the control objects and translating the received user input into a control command that is transmitted via the networking framework to one of the selected ones of the subset of the plurality of smart lighting objects corresponding to the one control object.

4. The method of claim 3, further comprising presenting a new camera image showing a new lighting condition based on the transmitted control command, wherein controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition comprises receiving a new user input based on the presented new camera image showing the new lighting condition and a new interaction with one of the control objects and translating the received new user input into a new control command that is transmitted via the networking framework to one of the selected ones of the subset of the plurality of smart lighting objects corresponding to the one control object.

5. The method of claim 2, wherein presenting the user interface including the camera image showing the current lighting condition on the display of the device comprises presenting one or more selections for predetermined lighting conditions that provide pre-programmed control settings of one or more of the subset of the plurality of smart lighting objects.

6. The method of claim 2, wherein controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition comprises disabling a light output of a first one or more of the subset of the plurality of smart lighting objects within the camera image and adjusting a light output of a second one or more of the subset of the plurality of smart lighting objects outside the camera image to control the lighting condition.

7. The method of claim 1, wherein controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition comprises:
    processing an image captured by a camera to determine a required level of light for the lighting condition;
    identifying, based the three dimensional map and the processed image, one or more of the subset of the plurality of smart lighting objects that can be adjusted to achieve the required level of light; and
    transmitting commands via the networking framework to adjust a light output of the identified one or more of the subset of the plurality of smart lighting objects to achieve the required level of light for the lighting condition.

8. The method of claim 7, further comprising:
    processing the image to determine further changes to lighting required to achieve the desired lighting condition; and
    transmitting commands via the networking framework to readjust one or more of the subset of the plurality of smart lighting objects to achieve the required level of light for the lighting condition based on the determined further changes to lighting required to achieve the desired lighting condition.

9. The method of claim 7, wherein transmitting commands via the networking framework to adjust a light output of the identified one or more of the subset of the plurality of smart lighting objects comprises transmitting commands to reduce a light output of a first one or more of the subset of the plurality of smart lighting objects within the image and to increase a light output of a second one or more of the subset of the plurality of smart lighting objects outside the image to achieve the required level of light for the lighting condition.

10. The method of claim 1, further comprising determining whether a current lighting condition includes sufficient light to take a picture, wherein controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition comprises:
processing an image captured by a camera to determine a required level of light for the lighting condition;
identifying, based on the three dimensional map and the processed image, one or more of the subset of the plurality of the smart lighting objects that to be adjusted to achieve the required level of light; and
transmitting commands via the networking framework to adjust a light output of the identified one or more of the subset of the plurality of smart lighting objects to achieve the required level of light for the lighting condition.

11. A control device, comprising:
a transceiver;
two or more ultrasound microphones; and
a processor coupled to the transceiver and the two or more ultrasound microphones, the processor configured with processor executable instructions to perform operations comprising:
executing a networking framework;
broadcasting a radio frequency (RF) signal on an RF communication channel associated with the networking framework from the control device for reception by a plurality of smart lighting objects registered with the networking framework, wherein each of the plurality of smart lighting objects is assigned an identifier within the networking framework, wherein the RF signal is configured to cause each of the plurality of smart lighting objects to transmit an ultrasound signal including the assigned identifier;
receiving ultrasound signals from a plurality of smart lighting objects via the two or more ultrasound microphones;
determining a range and a direction to each of the plurality of smart lighting objects from which ultrasound signals were received based on reception times of the ultrasound signals by each of the two or more ultrasound microphones;
generating a three dimensional map of locations of a subset of the plurality of smart lighting objects from which ultrasound signals were received based on the determined range and the determined direction; and
controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition.

12. The control device of claim 11, wherein the processor is configured with processor-executable instructions to perform operations further comprising presenting a user interface including a camera image showing a current lighting condition on a display of the control device, wherein the user interface includes control objects associated with the subset of the plurality of smart lighting objects from which ultrasound signals were received and wherein the control objects are presented on the camera image based on their location identified in the three dimensional map.

13. The control device of claim 12, wherein the processor is configured with processor-executable instructions to perform operations such that controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition comprises receiving a user input based on the presented camera image showing the current lighting condition and an interaction with one of the control objects and translating the received user input into a control command that is transmitted via the networking framework to the smart lighting object corresponding to the one control object.

14. The control device of claim 13, wherein the processor is configured with processor-executable instructions to perform operations:
further comprising presenting a new camera image showing a new lighting condition based on the transmitted control command; and
such that controlling a lighting condition by sending control signals, via the networking framework, to selected ones of the subset of the plurality of smart lighting objects based on the three dimensional map and the assigned identifier to cause the selected ones of the subset of the plurality of smart lighting objects to brighten or dim in order to achieve a desired lighting condition comprises receiving a new user input based on the presented new camera image showing the new lighting condition and a new interaction with one of the control objects and translating the received new user input into a new control command that is transmitted via the networking framework to the smart lighting object corresponding to the one control object.

15. The control device of claim 12, wherein the processor is configured with processor-executable instructions to perform operations such that presenting the user interface including the camera image showing the current lighting condition on the display of the device comprises presenting one or more selections for predetermined lighting conditions that provide pre-programmed control settings of one or more of the subset of the plurality of smart lighting objects.

16. The control device of claim 12, wherein the processor is configured with processor-executable instructions to perform operations such that controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition comprises disabling a light output of a first one or more of the subset of the plurality of smart lighting objects within the camera image and adjusting a light output of a second one or more of the subset of the plurality of smart lighting objects outside the camera image to control the lighting condition.

17. The control device of claim 11, wherein the processor is configured with processor-executable instructions to perform operations such that controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition comprises:

processing an image captured by a camera to determine a required level of light for the lighting condition;

identifying, based the three dimensional map and the processed image, one or more of the subset of the plurality of the smart lighting objects that can be adjusted to achieve the required level of light; and transmitting commands via the networking framework to adjust a light output of the identified one or more of the smart lighting objects to achieve the required level of light for the lighting condition.

18. The control device of claim 17, wherein the processor is configured with processor-executable instructions to perform operations further comprising:

processing the captured image to determine further changes to lighting required to achieve the desired lighting condition; and transmitting commands via the networking framework to readjust one or more of the smart lighting objects to achieve the required level of light for the lighting condition based on the determined further changes to lighting required to achieve the desired lighting condition.

19. The control device of claim 11, wherein the processor is configured with processor executable instructions to perform operations further comprising determining whether a current lighting condition includes sufficient light to take a picture, and wherein the processor is configured with processor executable instructions to perform operations such that controlling a lighting condition by sending control signals, via the networking framework, to selected ones of the subset of the plurality of smart lighting objects based on the three dimensional map to cause the selected ones of the subset of the plurality of smart lighting objects to brighten or dim in order to achieve a desired lighting condition comprises:

processing an image captured by a camera to determine a required level of light for the current lighting condition;

identifying, based the three dimensional map and the processed image, one or more of the subset of the plurality of the smart lighting objects that can be adjusted to achieve the required level of light; and transmitting commands via the networking framework to adjust a light output of the identified one or more of the subset of the plurality of smart lighting objects to achieve the required level of light for the lighting condition.

20. A non-transitory processor-readable storage medium having stored thereon processor-executable instructions configured to cause a processor of a control device to perform operations comprising:

executing a networking framework on the control device;

broadcasting a radio frequency (RF) signal on an RF communication channel associated with the networking framework from the control device for reception by a plurality of smart lighting objects registered with the networking framework, wherein each of the plurality of smart lighting objects is assigned an identifier within the networking framework, wherein the RF signal is configured to cause each of the plurality of smart lighting objects to transmit an ultrasound signal including the assigned identifier;

receiving ultrasound signals from a plurality of smart lighting objects in the control device via two or more ultrasound microphones;

determining a range and a direction to each of the plurality of smart lighting objects from which ultrasound signals were received based on reception times of the ultrasound signals by each of the two or more ultrasound microphones;

generating a three dimensional map of locations of a subset of the plurality of smart lighting objects from which ultrasound signals were received based on the determined range and the determined direction; and controlling a lighting condition by sending control signals, via the networking framework, to selected ones of the subset of the plurality of smart lighting objects based on the three dimensional map and the assigned identifiers of the selected ones of the subset of the plurality of smart lighting objects to cause the selected ones of the subset of the plurality of smart lighting objects to brighten or dim in order to achieve a desired lighting condition.

* * * * *